US007930146B2

(12) United States Patent
Chandler

(10) Patent No.: US 7,930,146 B2
(45) Date of Patent: Apr. 19, 2011

(54) ERRORS-IN-VARIABLES DATA PROCESSING INCLUDING ESSENTIAL WEIGHTING OF MAPPED PATH-ORIENTED DEVIATIONS WITH NORMAL COMPONENT DISCRIMINATION

(76) Inventor: Larry S. Chandler, Falls Church, VA (US)

( * ) Notice: Subject to any disclaimer, the term of this patent is extended or adjusted under 35 U.S.C. 154(b) by 495 days.

(21) Appl. No.: 11/802,553

(22) Filed: May 23, 2007

(65) Prior Publication Data

US 2008/0294371 A1 Nov. 27, 2008

(51) Int. Cl.
*G06F 19/00* (2006.01)
*G06F 17/40* (2006.01)

(52) U.S. Cl. .................................. 702/189; 702/187
(58) Field of Classification Search .............. 702/1, 33, 702/34, 66, 127, 179, 180, 181, 182, 183, 702/187, 188, 189, 57
See application file for complete search history.

(56) References Cited

U.S. PATENT DOCUMENTS

| | | | |
|---|---|---|---|
| 4,709,234 A | 11/1987 | Forehand et al. | |
| 4,889,132 A | 12/1989 | Hutcheson et al. | |
| 4,920,489 A | 4/1990 | Hubelbank et al. | |
| 5,263,486 A | 11/1993 | Jeffreys | |
| 5,475,628 A | 12/1995 | Adams et al. | |
| 5,568,400 A | 10/1996 | Stark et al. | |
| 5,619,432 A | 4/1997 | Chandler | |
| 5,652,713 A | 7/1997 | Chandler | |
| 5,884,245 A | 3/1999 | Chandler | |
| 5,982,943 A | 11/1999 | Hsu et al. | |
| 6,181,976 B1 | 1/2001 | Chandler | |
| 7,107,048 B2 * | 9/2006 | Chandler | 455/423 |
| 7,225,113 B2 * | 5/2007 | Rothschild | 703/2 |
| 7,280,988 B2 * | 10/2007 | Helsper et al. | 706/26 |
| 7,383,128 B2 * | 6/2008 | Chandler | 702/1 |
| 2003/0139905 A1 * | 7/2003 | Helsper et al. | 702/182 |
| 2003/0212528 A1 * | 11/2003 | Chandler | 702/179 |
| 2004/0059518 A1 * | 3/2004 | Rothschild | 702/18 |
| 2005/0114105 A1 * | 5/2005 | Barber | 703/2 |
| 2006/0111844 A1 * | 5/2006 | Chandler | 702/1 |

OTHER PUBLICATIONS

Ross, Regression Line Analysis, Am. J. Phys. 48(5) 409. May 1980.
Hull, Least-squares Method, Encyclopedia of Science, N.Y. pp. 648-649.
Elementary Concepts in Statistics, pp. 1-9. Copyright Statsoft Inc., 1984-2003. (.statsoft.com/textbook/esc.html).
Random Variable, pp. 1-4. (en.wikipedia.org/wiki/Random_variable), Aug. 12, 2007.
Statistical independence, pp. 1-3. (en.wikipedia.org/wiki/Statistical_independence), Sep. 27, 2007.
Tetruashvili, Complexity of the Decidability of the Unquantified Set Theory with a Rank Operator, Georgian Mathematical Journal, 1(1994), No. 5, 561-565.

(Continued)

*Primary Examiner* — Edward R Cosimano
(74) *Attorney, Agent, or Firm* — Crowell & Moring LLP

(57) ABSTRACT

Representations of data inversions are generated by alternate forms of maximum likelihood estimating which are rendered in correspondence with dependent coordinate mappings of path-oriented displacements. The dependent coordinate mappings are alternately considered to represent either path coincident deviations, path-oriented data-point projections. Normal displacements are rendered in normalized coordinates as a shortest distance between respective data samples and successive fitting function approximations. Deficiencies in representing likelihood as related to nonlinearities and heterogeneous precision are compensated by essential weighting of respectively mapped path-oriented displacements.

12 Claims, 9 Drawing Sheets

OTHER PUBLICATIONS

Esobar & West, Computing Bayesian Nonparametric Hierarchical Models, Discussion Paper 92-A20, Feb. 4, 1998, pp. 1-21, Duke University, ISDS.

Coy, Shades of Isaac Newton, LexisNexis Academic. Science & Technology; Mathematics.

Smyth, Review of "Exponential Family Nonlinear Models" by Bo-Cheng Wei. Austral. J. Statist. 42, 500, 2000, pp. 1-2.

Squire, Comment on "Linear least-squares fits with errors in both coordinates," by B.C. Reed. Am. J. Phys., vol. 58, No. 12, Dec. 1990.

Bendat, Modern Methods for Random Data Analysis, pp. 1-7.

Lybanon, Comment on "Least squares when both variables have uncertainties", Am. J. Phys., vol. 52, No. 3, Mar. 1984. pp. 276-278.

Lybanon, A better least-squares method when both variables have uncertainties, Am. J. Phys. 52(1), Jan. 1984. pp. 22-26.

Reed, Linear least-squares fits with errors in both coordinates. II: Comments on parameter variances, Am. J. Phys. 60(1). Jan. 1992. pp. 59-62.

Press & Teukolsky, Fitting Straight Line Data with Errors in Both Coordinates, Computers in Physics, vol. 6, No. 3, May/Jun. 1992, pp. 274-276.

Reed, Linear Least-squares fits with errors in both coordinates, Am. J. Phys. 57(7), Jul. 1989. pp. 642-646.

Luecke & Britt, Parameter estimation with error in the observables, Am. J. Phys, vol. 43, No. 4, Apr. 1975, pp. 372-374.

Clutton-Brock, Likelihood Distributions for Estimating Functions when Both Variables are Subject to Error, Technometrics, vol. 9, No. 2, May 1967, pp. 261-269.

Modeling of Data, Numerical Recipes in Fortran 77: The Art of Scientific Computing (ISBN 0-521-43064-X). Chapter 15, pp. 650-700, 1992.

Kyriakides & Tzes, Adaptive Fuzzy Dominant-Pole Placement Control, Proceedings of the 31st Conference on Decision & Control, Dec. 1992, pp. 2517-2522.

Fisher, On the Mathematical Foundations of Theoretical Statistics, Philosophical Transactions of the Royal Society of London. Series A, Containing Papers of a Mathematical or Physical Character, vol. 222(1992), 309-368.

York, Least-squares fitting of a straight line, Canadian Journal of Physics, vol. 44, 1996, pp. 1079-1086.

Barker & Diana, Simple method for fitting data when both variables have uncertainties, Am. J. Phys., vol. 42, Mar. 1974, pp. 224-227.

Nagy, Neural Networks—Then and Now IEEE Transactions on Neural Networks, vol. 2, No. 2, Mar. 1991, pp. 316-318.

El-Masry et al., Analog VLSI Current Mode Implementation of Artificial Neural Networks, IEEE, 1993, pp. 1275-1278.

Neri et al., Error-affected experimental data analysis: application to fitting procedures, Meas. Sci. Technol. 1 (1990) 1007-1010.

Bo & Yuhui, An Inverse-Deviation Threshold Approach in Neural Network Controllers, IEEE International Conference on Intelligent Processing Systems, 1997, pp. 407-409, Beijing, China.

Tzes & Kyriakides, Adaptive Fuzzy-Control for Flexible-Link Manipulators: a Hybrid Frequency-Time Domain Scheme, IEEE 1993, pp. 122-127.

Scharf, Total Least Squares, Addison-Wesley, N.Y. 1991, pp. 495-496.

Orear, Least squares when both variables have uncertainties, Am. J. Phys. 50(10), Oct. 1982, pp. 912-916.

Jefferys, On the Method of Least Squares, Astron. J. 85(2), Feb. 1980, pp. 177-181.

Jefferys, On the Method of Least Squares. II., Astron. J. 86(1), Jan. 1981, pp. 149-155.

Paveri-Fontana, A note on the random variable transformation theorem, Am. J. Phys., vol. 59, No. 9, Sep. 1991, pp. 854-856.

Neri et al., An accurate and straightforward approach to line regression analysis of error-affected experimental data, Journal of Physics, vol. 22, 1989, pp. 215-217.

MacDonald & Thompson, Least-squares fitting when both variables contain errors: Pitfalls and possibilities, Am. J. Phys. 60(1), Jan. 1992, pp. 66-72.

Press et al., Numerical Recipes: The Art of Scientific Computing, Cambridge University Press, 1986. pp. 498-528.

Picot, Pocket calculator program for least-square fitting of data with variable precision, Am. J. Phys. 48(4), Apr. 1980, pp. 302-303.

* cited by examiner

PATH ORIENTED DATA-POINT PROJECTIONS

TRANSVERSE COMPONENT MAPPING 13
$$\left(\frac{\mathcal{Y}'(X)(\mathcal{Y}-Y)\sqrt{\mathcal{V}_X}}{\mathcal{V}_Y}\right)$$

12 (X, G)

NORMAL PROJECTION FROM DATA TO FITTING FUNCTION 5
$$\frac{(\mathcal{Y}-Y)\sqrt{\mathcal{V}_Y + \mathcal{Y}'(\mathcal{X})^2 \mathcal{V}_X}}{\mathcal{V}_Y}$$

(X, Y)

APPROXIMATED PATH ORIENTED DATA-POINT PROJECTION 11
$$\frac{(\mathcal{Y}-Y)\sqrt{\mathcal{V}_Y + \mathcal{Y}'(X)^2 \mathcal{V}_X}}{\mathcal{V}_Y}$$

DEPENDENT RESIDUAL DIVIDED BY THE SQUARE ROOT OF EFFECTIVE VARIANCE
$$\frac{(\mathcal{Y}-Y)}{\sqrt{\mathcal{V}_Y + \mathcal{Y}'(X)^2 \mathcal{V}_X}}$$

C  MAPPED COMPONENT PROJECTION/INVERSION INTERSECTION 6

FITTING FUNCTION 1

FIG.1

PART 1 OF A QBASIC PATH DESIGNATING SUBROUTINE BEING IMPLEMENTED FOR GENERATING DEPENDENT COORDINATE MAPPINGS OF CONSIDERED DEVIATION PATHS

```
SUB PATH (DV%, IV%, V1%, V2%, VSTEP%, RP%, K%, ROOT#, DELG#, WT#)

'***************** SHARED STORAGE DESIGNATOR **************** 36
SHARED NFP%, NDF%, SUMO%, PTH%(), WTOP%(), RTYP$(), RD#(), EV#()
SHARED DDP#(), DDX#(), DDXP#(), DDXX#(), DGDP#(), RTS%

'*********** TYPE 2 DEVIATION VARIABILITY GENERATOR ********* 37
TYPE2# = 0#
FOR I% = V1% TO V1% + VSTEP% STEP VSTEP%
 IF I% <> DV% THEN
  TYPE2# = TYPE2# + EV#(I%) * DDX#(I%) ^ 2
 END IF
NEXT

'***************** VARIABILITY TYPE SELECTOR **************** 38
SELECT CASE RTYP$(RP%)           'SELECT PATH VARIABILITY TYPE
 CASE "2"     'FOR PATH ORIENTED DATA-POINT PROJECTIONS
  PV# = TYPE2#
 CASE "3"     'FOR PATH COINCIDENT DEVIATIONS
  PV# = EV#(DV%)
END SELECT

'*************** EFFECTIVE VARIANCE GENERATOR *************** 39
EFFVAR# = TYPE2# + EV#(DV%)

'****** MAPPED DEVIATION PATH AND SKEW RATIO GENERATOR ****** 40
SELECT CASE PTH%(RP%)  'DELG# REPRESENTS IS THE DEVIATION PATH.
 CASE 0, 1, 2                    'FOR A TRANSVERSE PATH,    41
  DELG# = (ROOT# - RD#(K%, DV%)) * SQR(TYPE2#) / EV#(DV%)
  SKRA# = EV#(DV%) / SQR(TYPE2#)
 CASE 3, 4                       'FOR A NORMAL PATH,        42
  DELG# = (ROOT# - RD#(K%, DV%)) * SQR(EFFVAR#) / EV#(DV%)
  SKRA# = EV#(DV%)/ SQR(EFFVAR#)
 CASE 5, 6    'FOR AN EFFECTIVE VARIANCE NORMALIZATION,     43
  DELG# = (ROOT# - RD#(K%, DV%)) / SQR(EFFVAR#)
  SKRA# = SQR(EFFVAR#)
 CASE 7                 'FOR A COORDINATE ORIENTED PATH,    44
  DELG# = (ROOT# - RD#(K%, DV%))/ SQR(EV#(DV%))
  SKRA# = SQR(EV#(DV%))
END SELECT
```

FIG. 4

PART 2 OF A QBASIC PATH DESIGNATING SUBROUTINE BEING IMPLEMENTED FOR GENERATING PATH FUNCTION DERIVATIVES WITH RESPECT TO FITTING PARAMETERS

```
'********** PATH FUNCTION DERIVATIVE GENERATOR ********** 45
FOR I% = 1 TO NFP%   'COMPUTE THE PATH FUNCTION DERIVATIVE
  NUMSUM# = 0#         ' WITH RESPECT TO FITTING PARAMETERS
  DENSUM# = 0#
  IF PTH%(RP%) < 7 THEN

'*************** VARIABLE SELECTION SORTER ************** 46
    FOR J% = V1% TO V2% STEP VSTEP%
      IF SUMO% <> 2 AND SUMO% <> 4 THEN
        IF J% <> IV% AND J% <> DV% THEN GOTO NEXTJ
      END IF

'***************** SPECIFICATION ADAPTER **************** 47
      IF PTH%(RP%) > 2 OR J% <> DV% THEN

'************* NUMERATOR/DENOMINATOR GENERATOR ********** 48
        NUMSUM# = NUMSUM# + EV#(J%) * DDXP#(J%, I%) * DDX#(J%)
        DENSUM# = DENSUM# + EV#(J%) * DDX#(J%) ^ 2
      END IF
NEXTJ:
    NEXT

'****************** DERIVATIVE COMPILER ***************** 49
    IF RTS% > 2 THEN NUMSUM# = 0 'A FIRST DERIVATIVE REDUCTION.
    SELECT CASE PTH%(RP%)
      CASE 0, 1, 2, 3, 4
        DGDP#(I%) = DDP#(I%) + ROOT# * NUMSUM# / DENSUM#
        IF RTS% = 2 THEN       'SET A DESIGNATED PATH REDUCITON.
          DGDP#(I%) = DGDP#(I%) - RD#(K%, DV%) * NUMSUM# / DENSUM#
        END IF
      CASE 5, 6
        DGDP#(I%) = DDP#(I%) - ROOT# * NUMSUM# / DENSUM#
        IF RTS% = 2 THEN       'SET A DESIGNATED PATH REDUCITON.
          DGDP#(I%) = DGDP#(I%) + RD#(K%, DV%) * NUMSUM# / DENSUM#
        END IF
    END SELECT
    DGDP#(I%) = DGDP#(I%) / SKRA#
  END IF
  IF PTH%(RP%) > 6 THEN DGDP#(I%) = DDP#(I%)
NEXT
```

FIG. 5

PART 3 OF A QBASIC PATH DESIGNATING SUBROUTINE BEING IMPLEMENTED FOR GENERATING PATH FUNCTION DERIVATIVES WITH RESPECT TO INDEPENDENT VARIABLES

```
'***** PATH FUNCTION DERIVATIVE GENERATOR (CONTINUED) ***** 45
REDIM DGDX#(NDF%)

'**** WEIGHT FACTOR INITIALIZER AND DEFAULT GENERATOR ***** 50
WT# = 1#
IF WTOP%(RP%) > 4 THEN EXIT SUB
IF WTOP%(RP%) < 2 THEN WT# = 0#

'*************** VARIABLE SELECTION SORTER ************** 51
FOR I% = V1% TO V2% STEP VSTEP%
  IF I% = DV% THEN GOTO OUTI

'**************** SUMMATION INITIALIZER **************** 52
  NUMSUM# = 0#
  DENSUM# = 0#

'**************** VARIABLE SELECTION SORTER ************** 53
  FOR J% = V1% TO V2% STEP VSTEP%
    IF SUMO% > 4 THEN
      IF J% <> DV% AND J% <> IV% THEN GOTO OUTJ
    END IF

'************ NUMERATOR/DENOMINATOR GENERATOR *********** 54
    IF PTH% > 2 OR J% <> DV% THEN
    NUMSUM# = NUMSUM# + EV#(J%) * DDXX#(J%, I%) * DDX#(J%)
    DENSUM# = DENSUM# + EV#(J%) * DDX#(J%) ^ 2
    END IF
OUTJ:
  NEXT

'****************** DERIVATIVE COMPILER ***************** 55
'HERE SET NUMSUM# = 0 FOR A FIRST DERIVATIVE WEIGHT FACTOR.
SELECT CASE PTH%(RP%)
  CASE 0, 1, 3
    DGDX#(I%) = DDX#(I%) + ROOT# * NUMSUM# / DENSUM#
  CASE 2, 4
    DPTH# = DDX#(I%) + ROOT# * NUMSUM# / DENSUM#
    DGDX#(I%) = DPTH# - RD#(K%, DV%) * NUMSUM# / DENSUM#
  CASE 5
    DGDX#(I%) = DDX#(I%) - ROOT# * NUMSUM# / DENSUM#
  CASE 6
    DPTH# = DDX#(I%) - ROOT# * NUMSUM# / DENSUM#
    DGDX#(I%) = DPTH# + RD#(K%, DV%) * NUMSUM# / DENSUM#
END SELECT
DGDX#(I%) = DGDX#(I%) / SKRA#
IF PTH%(RP%) > 6 THEN DGDX#(I%) = DDX#(I%)
```

FIG. 6

PART 4 OF A QBASIC PATH DESIGNATING SUBROUTINE BEING IMPLEMENTED FOR GENERATING WEIGHT FACTORS

```
'**************** WEIGHT FACTOR GENERATOR **************** 56
SELECT CASE WTOP%(RP%)
 CASE 0, 1
  IF I% <> DV% THEN

'******* TAILORED WEIGHT FACTOR GENERATOR (PART 1) ******** 57
   WT# = WT# + PV# / EV#(I%) / DGDX#(I%) ^ 2 / SKRA# ^ 2
  END IF

CASE 2
'******* SPURIOUS WEIGHT FACTOR GENERATOR (PART 1) ******** 58
  IF I% <> DV% THEN
   WT# = WT# * PV# / EV#(I%) / DGDX#(I%) ^ 2 / SKRA# ^ 2
  END IF
END SELECT
OUTI:
NEXT
SELECT CASE WTOP%(RP%)

CASE 0, 1
'************ TAILORED WEIGHT FACTOR (PART 2) **************
'********* AND ESSENTIAL WEIGHT FACTOR GENERATOR ********** 59
   WT# = SQR(WT#) * SKRA# ^ 2 / PV#

CASE 2
'*********** SPURIOUS WEIGHT FACTOR (PART 2) **************
'********** AND CURSORY WEIGHT FACTOR GENERATOR ********** 60
   WT# = WT# ^ (VSTEP% / (V2% - V1%)) * SKRA# ^ 2 / PV#

CASE 3, 4
'*********** NORMALIZATION WEIGHT FACTOR GENERATOR *********
'*********** AND SKEW RATIO WEIGHT FACTOR GENERATOR ******* 61
   WT# = SKRA#
   IF WTOP%(RP%) = 3 THEN
    WT# = WT# / SQR(PV#)
   END IF
END SELECT
END SUB
```

FIG. 7

EXEMPLARY QBASIC COMMAND CODE FOR ESTABLISHING PROJECTION INTERSECTIONS

```
'*********** PROJECTION INTERSECTION GENERATOR ************ 62
DELY# = (ROOT# - RD#(I%, DV%)) / EV#(DV%)
IVROOT# = FUN#(FUNREF$, I%, IV%, DV%, EP#(), R%, NR%)
IF ING% = 1 THEN PRINT "  RANGE FOR INDEPENDENT VARIABLE:";
IF ING% = 1 THEN PRINT RD#(I%, IV%); "TO"; IVROOT#
R1# = IVROOT#
R2# = RD#(I%, IV%)
SL# = -1
IF R2# >= R1# THEN SL# = 1#
DELX# = (IVROOT# - RD#(I%, IV%)) / EV#(IV%)
DELX# = DELX# * DELY# ^ 2 / (DELX# ^ 2 + DELY# ^ 2)
RD#(I%, IV%) = RD#(I%, IV%) + DELX#
FOR OP% = 1 TO 20
 ROOT# = FUN#(FUNREF$, I%, DV%, IV%, EP#(), R%, NR%)
 RD#(I%, DV%) = ROOT#
 IF DELX# = 0 THEN EXIT FOR
 IF OP% = 1 THEN
  IF ING% = 1 THEN PRINT O; RD#(I%, IV%); " "; RD#(I%, DV%)
  EIV# = RD#(I%, IV%)  ' SET FIRST APPROXIMATION ESTIMATE.
  EDV# = RD#(I%, DV%)
 END IF
 RD#(I%,IV%)=(SAVDV#-RD#(I%,DV%))*DDX#(IV%)*EV#(IV%)/EV#(DV%)
 RD#(I%, IV%) = RD#(I%, IV%) + SAVIV#
 IF ING% = 1 THEN PRINT OP%; RD#(I%, IV%); " "; RD#(I%, DV%)
 IF SL#*RD#(I%,IV%)>SL#*R2# OR SL#*RD#(I%,IV%)<SL#*R1# THEN
  RD#(I%, IV%) = EIV#
  RD#(I%, DV%) = EDV#
  RD#(I%, DV%) = FUN#(FUNREF$, I%, DV%, IV%, EP#(), R%, NR%)
  IF ING% = 1 OR CAUCHK% = 0 THEN
  PRINT "CAUTION, CONVERGENCE IS UNSTABLE."
  PRINT "INTERSECTION IS BEING SET TO FIRST APPROXIMATION."
  PRINT OP%; RD#(I%, IV%); " "; RD#(I%, DV%)
  CAUCHK% = 1
  END IF
  EXIT FOR
 END IF
 IF ING% = 1 THEN LOOK$ = INPUT$(1)
 IF LOOK$ = "C" OR LOOK$ = "c" THEN ING% = 0
NEXT
```

FIG. 8

ERRORS-IN-VARIABLES DATA PROCESSING INCLUDING ESSENTIAL WEIGHTING OF MAPPED PATH-ORIENTED DEVIATIONS WITH NORMAL COMPONENT DISCRIMINATION

REFERENCE TO APPENDICES A, B, AND C

This disclosure includes a computer program listing and simulated support data, Appendices A, B, and C submitted in the form of a compact disk Appendix containing respective files Appendix A, created Apr. 19, 2007, containing QBASIC command code file Errinvar.bas, comprising 102K memory bytes; Appendix B, created Apr. 19, 2007, containing QBASIC command code file Search.bas, comprising 105K memory bytes; and Appendix C, containing eleven ascii alpha numeric data files created between Mar. 24, 2006 and Apr. 16, 2007, comprising a total of 13K memory bytes, which are incorporated herein by reference.

STATEMENT OF DISCLOSURE COPYRIGHT

Copyright materials here presented or included by appendix may be reproduced by the Government of the United States for purposes of present invention patent disclosure. Unauthorized reproduction is prohibited. ©2007 L. S. Chandler.

BACKGROUND OF THE INVENTION

The present invention relates to a data processing system comprising a control system and a weight factor generator considering automated forms of data processing, more particularly implementing forms of errors-in-variables data reductions being rendered to include essential weighting of squared reduction deviations in order to provide for adequate representation of system behavior.

As empirical relationships are often required to describe system behavior, data analysts continue to rely upon least-squares and maximum likelihood approximation methods to fit both linear and nonlinear functions to experimental data. Fundamental concepts, related to both maximum likelihood estimating and least-squares curve fitting, stem from the early practice referred to in 1766 by Euler as calculus of variation. The related concepts were developed in the mid 1700's, primarily through the efforts of Lagrange and Euler, utilizing operations of calculus for locating maximum and minimum function value correspondence. The maximum and minimum values and certain inflection points of the function occur at coordinates which correspond to points of zero slope along the curve. To determine the point where a minimum or maximum occurs, one derives an expression for the derivative (or slope) of the function and equates the expression to zero. By merely equating the derivative of the function to zero, local parameters, which respectively establish the maximum or minimum function values, can be determined.

The process of Least-Squares analysis utilizes a form of calculus of variation in statistical application to determine fitting parameters which establish a minimum value for the sum of squared single component residual deviations from a parametric fitting function. The process was first publicized in 1805 by Legendre. Actual invention of the least-squares method is clearly credited to Gauss, who as a teenage prodigy first developed and utilized it prior to his entrance into the University of Göttingen.

Maximum likelihood estimating has a somewhat more general application than that of least-squares analysis. It is traditionally based upon the concept of maximizing a likelihood, which may be defined either as the product of discrete sample probabilities or as the product of measurement sample probability densities, for the current analogy and in accordance with the present invention, it may be either, or a combination of both. By far, the most commonly considered form for representing a probability density function is referred to as the normal probability density distribution function (or Gaussian distribution). The respective Gaussian probability density function as formulated for a standard deviation of $\sigma_Y$, in the measurement of $\mathcal{Y}$ will take the form of Equation 1:

$$D(Y-y) = \frac{1}{\sqrt{2\pi\sigma_Y^2}} e^{-\frac{(Y-y)^2}{2\sigma_Y^2}}, \qquad (1)$$

wherein D represents a probability density, Y represents either a single component observation or a dependent variable measurement, and $\mathcal{Y}$ represents the expected or true value for said single component or said dependent variable. The formula for the Gaussian distribution was apparently derived by Abraham de Moivre in about 1733. The distribution function is dubbed Gaussian distribution due to extensive efforts of Gauss related to characterization of observable errors. Consistent with the concept of a probability density distribution function, the actual probability of occurrence is considered as the integral or sum of the probability density, taken (or summed) over a range of possible samples. A characteristic of probability distribution functions is that the area under the curve, considered between minus and plus infinity or over the range of all possible dependent variable measurements, will always be equal to unity. Thus, the probability of any arbitrary sample lying within the range of the distribution function entire is one, e.g., $$\int_{-\infty}^{+\infty} D(Y-y) dY = 1. \qquad (2)$$

For a typical linear Gaussian Likelihood estimator, $L_Y$, being considered to exemplify variations in the measurement of $\mathcal{Y}$ as a single valued function or as a linear function with the mean squared deviations associated with each data sample being independent of coordinate location, the explicit likelihood estimator will take the form of Equation 3:

$$L_Y = \prod_{k=1}^{K} \frac{1}{\sqrt{2\pi\sigma_Y^2}} e^{-\frac{(Y-y)_k^2}{2\sigma_Y^2}} \qquad (3)$$

$$= \left( \prod_{k=1}^{K} \frac{1}{\sqrt{2\pi\sigma_Y^2}} \right) e^{-\sum_{k=1}^{K} \frac{(Y-y)_k^2}{2\sigma_Y^2}}.$$

The Y subscript on the likelihood estimator without an additional subscript indicates the product of probabilities (or the product of probability density functions) being related to measurements of the dependent variable, $\mathcal{Y}$, as an analytical representation of a respective data sample, $Y_k$. The lower case italic $k$ subscript designates the data sample or respective data-point coordinate measurement, and the upper case K represents the total number of data points being considered.

A simplified form for maximizing the likelihood is rendered by taking the natural log of the estimator, as exemplified by Equation 4:

$$\ln L_Y = \ln\left(\prod_{k=1}^{K} \frac{1}{\sqrt{2\pi\sigma_Y^2}}\right) - \sum_{k=1}^{K} \frac{(Y-y)_k^2}{2\sigma_Y^2}. \quad (4)$$

Since the maximum values for the natural log of $L_Y$ will always coincide with the maximum values for $L_Y$, maximum likelihood can be determined by equating the derivatives of $\ln L_Y$ to zero. The first term on the right hand side of Equation 4 can be considered to be a determined constant which need not be included. The term on the far right represents minus one half of the respective sum of squared deviations, so that maximizing the log of the likelihood should provide the same set of inversion equations as will minimize the respective sum of correspondingly weighted square deviations. In accordance with the present invention, the likelihood estimator is independent of the sign of a deviation being squared, so that whether the deviation is generated as $Y-\mathcal{Y}$ or $\mathcal{Y}-Y$, the square of that deviation will be the same. Taking the partial derivative of $\ln L_Y$ with respect to each of the fitting parameters, $P_p$, will yield:

$$\frac{\partial \ln L_Y}{\partial P_p} = \sum_{k=1}^{K} \frac{(Y-y)_k}{\sigma_Y^2} \frac{\partial y_k}{\partial P_p}. \quad (5)$$

The p subscript is included to respectively designate each included fitting parameter. Replacing the parametric fitting parameter representations, $P_p$, by determined ones, $\mathcal{P}_p$, and equating the partial derivatives to zero will yield Equations 6:

$$\sum_{k=1}^{K} \frac{(Y-y)_k}{\sigma_Y^2} \left(\frac{\partial y_k}{\partial P_p}\right)_{\mathcal{P}_p} = 0. \quad (6)$$

The close parenthesis with double subscript $\mathcal{P}_p$ is included to indicate replacement of each $P_p$ with its respectively determined counter part, $\mathcal{P}_p$. The k subscript infers representation of, or evaluation with respect to, a corresponding observation sample measurement or a respective coordinate sample datum.

Note that the construction of the center equality of Equation 3 is based upon the assumption that the likely deviation of each included sample is Gaussian. Such is seldom the case, but the validity of Equation 3 can be alternately based upon the premise that the sums of arbitrary groupings of sample deviations with non-skewed uncertainty distributions may also be considered as Gaussian.

In accordance with the present invention, non-skewed error distributions, including non-skewed probability density distributions, may be defined as any form of observation uncertainty distributions for which the mean sample value can always be assumed to approach a "true" value (or acceptably accurate mean representation for what is assumed to be the expected or true value) in the limit as the number of random samples approaches infinity.

In accordance with the present invention, mean squared deviations, which are established from groupings of arbitrary samples of non-skewed homogeneous error distributions, can be treated as Gaussian. By alternately considering the likelihood estimator as the product of probabilities of one or more such groupings, rather than the product of individual sampling probabilities, the validity of Equation 3 may be established. In accordance with the present invention, the validity of Equation 3 may be established for applications which are subject to the condition that the summation in the exponent of the second term on the right is at least locally representative of sufficient numbers of data samples of non-skewed uncertainty distribution to establish appropriate mean values along the fitting function. The likelihood estimator can be alternately written in the form of Equations 7 to establish representation of such groupings:

$$L_Y = \prod_{g=1}^{G} \prod_{k_g=1}^{K_g} \frac{1}{\sqrt{2\pi\sigma_Y^2}} e^{-\sum_{k_g=1}^{K_g} \frac{(Y_g - y_g)_{k_g}^2}{2\sigma_Y^2}} \quad (7)$$

$$= \prod_{g=1}^{G} \prod_{k_g=1}^{K_g} \frac{1}{\sqrt{2\pi\sigma_Y^2}} e^{-\frac{K_g \overline{(Y_g - y_g)^2}}{2\sigma_Y^2}}$$

$$= \left(\prod_{g=1}^{G} \prod_{k_g=1}^{K_g} \frac{1}{\sqrt{2\pi\sigma_Y^2}}\right) e^{-\sum_{g=1}^{G} \frac{K_g \overline{(Y_g - y_g)^2}}{2\sigma_Y^2}}$$

$$= \left(\prod_{k=1}^{K} \frac{1}{\sqrt{2\pi\sigma_Y^2}}\right) e^{-\sum_{k=1}^{K} \frac{(Y-y)_k^2}{2\sigma_Y^2}}.$$

The subscript g of Equations 7 designates the group; the typewriter type G represents the number of groups; the $K_g$ represents the number of samples associated with each respective group; and the $k_g$ refers to the specific sample of the respective group, such that the total number of data samples is equal to the sum of the samples included in each group. The line over the squared deviations is placed to indicate the mean squared deviation which may be statistically considered or simply obtained by dividing the sum of the squared deviations by the number of addends, or in this example $K_g$. Notice that a relative weighting of the mean squared deviation of each group, as included in the overall sum of squared deviations, is dependent upon an observation occurrence which, in this example, may be assumed to be proportional to the number of elements in the respective group and not the square of said number of elements. In addition, in accordance with the present invention, note that changes in slope along a fitting function segment will also affect probability of occurrence. The terminology "locally representative," as considered in correspondence with a specified fitting function, may be defined as over local regions with only small or assumed insignificant changes in slope, or said locally representative may be alternately defined as over local regions without extreme changes in slope.

In consideration of applications of Equation 3, with provision of sample groupings as exemplified by Equations 7 being subject to the condition that the mean square deviations of each of the considered groupings can be assumed to be representative of a Gaussian distribution, in accordance with the present invention the validity of Equations 6 can be established in any one of three ways. These are:

1. Each data sample can be representative of a uniform Gaussian uncertainty distribution over the extremities of a linear fitting function;

2. Each data sample can be representative of a point-wise non-skewed uncertainty distribution, assuming sufficient data samples of a same distribution are provided at each localized region along the fitting function to establish localized sums of nonlinear samples as being characterized by homogeneous Gaussian distribution functions;

3. Each data sample can be representative of a point-wise Gaussian uncertainty distribution, also assuming sufficient data samples of a same distribution are provided at each localized region along the fitting function to establish localized sums of nonlinear samples as being characterized by homogeneous Gaussian distribution functions.

In accordance with the present invention, conditions for maximum likelihood can be alternately realized for data not satisfying any of these three criteria, provided that the elements of the likelihood estimator, as rendered to represent the observation samples and as correspondingly rendered in the sum of squared reduction deviations can be appropriately rendered, normalized, and weighted to compensate for skewed error distributions, nonlinearities, and all associated heterogeneous sampling. In accordance with the present invention, reduction deviations are analytically represented deviations that are assumed to characterize a mean error displacement path. Reduction deviations, alternately referred to herein as path oriented deviations, can be rendered in any of at least four representative forms. These are:
1. coordinate oriented residual deviations,
2. coordinate oriented data-point projections,
3. path coincident deviations, and
4. path oriented data-point projections.

The sums of squared reduction deviation as included in representing the likelihood elements should be rendered to weight all considered forms of observation occurrence. In accordance with the present invention, tailored weight factors should be included within said sums of squared reduction deviations to compensate for observation occurrence which may be associated with nonlinear and heterogeneous observation sampling, thus allowing each individual representation of path coincident deviation or data-point projection which might be included in the likelihood estimator to be characterized by a single, unified, and normal (or Gaussian) uncertainty distribution.

In accordance with the present invention, Equations 6 may be alternately written to compensate for skewed uncertainty distributions, nonlinearities and/or heterogeneous sampling by including representation for an essential weight factor, W, as in Equations 8:

$$\sum_{k=1}^{K} \mathcal{W}_{Y_k}(Y-y)_k \left(\frac{\partial y_k}{\partial P_p}\right)_{\mathcal{P}_p} = 0. \tag{8}$$

The Y subscript on the essential weight factor, as in the case of Equations 8, implies the weighting of residual deviations between dependent variable sample measurements, Y, and the respectively evaluated dependent variable, $\mathcal{Y}$.

In accordance with the present invention, the essential weight factor, $\mathcal{W}$, may be defined as comprising a tailored weight factor, W, being multiplied by the square of a deviation normalization coefficient, $\mathcal{C}$. The purpose of said deviation normalization coefficient is to render the deviation so as to be characterized by a non-skewed homogeneous uncertainty distribution mapped on to a selected dependent variable coordinate. In accordance with the present invention, said deviation normalization coefficient may be defined as the ratio of a non-skewed dependent component deviation to a dependent coordinate deviation mapping, generally rendered as a presumed skew ratio, $\mathcal{R}$, normalized on the square root of said non-skewed dependent component deviation variability, $\mathcal{V}_\mathcal{R}$:

$$C = \frac{\mathcal{R}}{\sqrt{\mathcal{V}_\mathcal{R}}}, \frac{\mathcal{R}_\mathcal{G}}{\sqrt{\mathcal{V}_\mathcal{G}}}. \tag{9}$$

The leads to sign, $\rightsquigarrow$, suggests one of a plurality of considered representations. The calligraphic $\mathcal{G}$ subscript implies application to path-oriented data-point projections. A similarly placed sans serif G subscript would imply application to path coincident deviations. In accordance with the present invention, the skew ratio may be defined as the ratio of a non-skewed representation for dependent component deviation to a respective coordinate representation for a considered reduction deviation. In accordance with the present invention, variability is of broader interpretation than the square of the standard deviation. It is not limited to specifying the mean square deviation but may represent alternate forms of uncertainty, including estimates and measurements, as considered in correspondence with respective data sampling or as associated with considered data point projections; and it may be alternately rendered as a form of dispersion accommodating variability or alternately include the effects of independent measurement error and/or antecedent measurement dispersions; said antecedent measurement dispersions being considered in correspondence with uncertainty in said data sampling or in the representation or mapping of path coincident deviations or path-oriented data-point projections as considered herein, or coordinate oriented data-point projections as previously considered by the present inventor in U.S. Pat. No. 7,107,048 and U.S. patent application Ser. No. 11/266,224, now U.S. Pat. No. 7,383,128. In accordance with the present invention, weight factors, skew ratios, deviation coefficients, and variability should all be considered as functions of the provided data as related to a "hypothetically ideal fitting function" and, as such, they (or successive estimates of the same) should be held constant during minimizing and maximizing procedures associated with forms of calculus of variation which may be implemented for the optimization of fitting parameters.

The deviation variability, $\mathcal{V}_\mathcal{R}$, as included in representing tailored and essential weighting of squared deviations, in accordance with the present invention, may be considered in at least two general types, which are herein designated symbolically as:
1. $\mathcal{V}_\mathsf{G}$, referring to the considered variability of assumed-to-be non-skewed dependent variable data samples; and
2. $\mathcal{V}_\mathcal{G}$, referring to estimates for the considered variability of determined values for the dependent variable as a function of independent variable observation samples.

Referring now to deviation variability type 1 and considering a simple application with errors being limited to the dependent variable, that is: assuming a non-skewed homogeneous error distribution in measurements of the dependent variable, for no errors in the independent variable or independent variables (plural, as the case may be) the variability of the dependent component deviation can be considered equal to the mean square deviations (or square of the standard deviation, $\sigma_Y^2$ of the dependent variable measurements. The respective essential weight factor may be represented as the tailored weight factor, $W_{Y_k}$, normalized on the square of the standard deviation and multiplied by the square of the skew ratio:

$$\mathcal{W}_{Y_k} \sim \frac{w_{Y_k}}{\sigma_{Y_k}^2} \mathcal{R}_{Y_k}^2. \quad (10)$$

For this specific application, the skew ratio (being rendered for a homogeneous uncertainty distribution) would be equal to one. The subscripts, Y, which are included on the skew ratio and tailor weight factor, imply that the essential weighting is being tailored to the function $\mathcal{Y}$ of path coincident devations, $Y_k - \mathcal{Y}_k$, whose sample measurements, $Y_k$, as normalized on the local characteristic standard deviations, $\sigma_{Y_k}$, are assumed representative of non-skewed error distributions. The deviation variability in Equations 10 is assumed to be represented as the mean squared deviation or the square of the standard deviation. The subscript k designates each single observation comprising the dependent and independent variable sample measurements.

In accordance with the present invention, a representation for essential weight factors with the deviation variability type 1, as considered for weighting of path coincident deviations, may be expressed in a general form by Equations 11.

$$\mathcal{W}_{G_k} = \mathcal{R}_{G_k}^2 \frac{w_{G_k}}{\mathcal{V}_{G_k}}, \quad (11)$$

wherein general representation for a mapped observation sample, G, is included as a subscript to imply allowance, by weight factor tailoring, for any considered representation, transformation, or mapping of a path coincident deviation onto the currently considered dependent variable coordinate, as a function of N−1 independent variables, $\mathcal{X}_i$.

In accordance with the present invention, a representation for essential weight factors with the deviation variability type 2, as considered for weighting of squared path-oriented data-point projections, may be expressed in a general form by Equations 12.

$$\mathcal{W}_{\mathcal{G}_k} = \mathcal{R}_{\mathcal{G}_k}^2 \frac{w_{\mathcal{G}_k}}{\mathcal{V}_{\mathcal{G}_k}}, \quad (12)$$

wherein general representation for a path designator, $\mathcal{G}$, is included as a subscript to imply allowance, by weight factor tailoring, for any considered representation, transformation, or mapping of a path-oriented data point projection onto the currently considered dependent variable coordinate as a function of N−1 independent variables, $\mathcal{X}_i$.

Assume a general form for said path designator to be a function of the independent variable or variables, such that:

$$\mathcal{G} = \mathcal{G}(\mathcal{X}_1, \ldots, \mathcal{X}_i, \ldots, \mathcal{X}_{N-1}), \quad (13)$$

where $\mathcal{G}$ is considered, in accordance with the present invention, to represent said general form as the function term of a path-oriented deviation which can, for example, be evaluated in correspondence with data samples, $XX_{ik}$, of said independent variable or variables, i.e.

$$\mathcal{G}_k = \mathcal{G}(X_{1k}, \ldots, X_{ik}, \ldots, X_{N-1,k}). \quad (14)$$

So evaluated, the path designator will establish data-point projections, approximate path coincident deviations, or dependent coordinate mappings of displacements which, when most appropriately rendered, should directly correspond in proportion to the measure between the data point and the intersection of said path with the considered fitting function (or a reliable estimate of the same.)

In accordance with the present invention, the subscript $\mathcal{G}$, as considered herein, may be replaced by an alternate subscript, G, to distinguish the normalization of path coincident deviations being based upon a concept of sample displacements from true or expected values. Certain past concepts of statistics have been hypothetically based upon this specification. These concepts can only be consistent with Equation 13 provided that the true or expected value can be expressed as a function of orthogonal variable samples. Such cannot be the case when there are errors in said orthogonal variable samples. For appropriate applications, at least one of three alternate considerations can be made:

1. One can assume that errors in independent variables are indeed small or nonexistent;

2. For a sufficient amount of data, if the considered path as represented or appropriately weighted can be considered to correspond to a mean deviation path, then one can assume path coincident deviations; or

3. One can replace the considered residual deviations by dependent coordinate mappings of path-oriented data-point projections between sampled data points and points that lie on the considered fitting function. Coordinate oriented data-point projections are defined in U.S. Pat. No. 7,107,048 as "... the projection of elements of data-point sets (or data-point defining sets) along corresponding coordinates onto a representation of a data inversion comprising an approximating relationship or a considered estimate of the same." Path-oriented data-point projections, as disclosed in accordance with the present invention, establish an alternate data reduction concept, which is not limited to orientation along coordinate axes but can be alternately considered along any appropriately characterized deviation path.

Referring to consideration #1, as the errors in the independent variables are small or nonexistent, the independent variable data samples can be considered to lie on the fitting function proper, and the path designator of Equation 13 can be correspondingly evaluated, thus, providing a valid reduction when errors are limited to the dependent variable.

To address consideration #2, that of path coincident deviations, that is, assuming that the defined path might represent a mean deviation path: This assumption has to be based upon the premise that the path designator, as an evaluated function of displaced data samples, is a sufficiently accurate approximation and that the defined deviation path actually represents the expected path of the deviations. In accordance with the present invention, by assuming path coincident deviations, the Gaussian distribution of Equation 1 can be alternately expressed by the approximation of Equation 15 to accommodate maximum likelihood estimating with respect to associated deviation paths with type 1 deviation variability:

$$D\left(\frac{W_G \mathcal{R}_G^2 (G-\mathcal{G})^2}{2\mathcal{V}_G}\right) \approx \frac{1}{\sqrt{2\pi M_G}} e^{-\frac{W_G \mathcal{R}_G (g-\mathcal{G})^2}{2\mathcal{V}_G M_G}}, \quad (15)$$

wherein the deviation is considered as lying along the designated path, originating from the fitting function, and extending to the data sample. Note that the calligraphic subscript $\mathcal{G}$ on the variability, weight factors, and skew ratio of Equations 11 has been replaced in Equation 15 by a sans serif G to indicate that the respective weighting and normalization of the considered deviations are assumed for path coincident deviations to be directly, or at least primarily, associated with the observation uncertainty. The deviation variability, $\mathcal{V}_G$, is correspondingly defined, in accordance with the present invention, as the variability which is to be associated with the normalization of respective path coincident deviations. An approximation sign is included in Equation 15 as a result of the approximation that path coincident deviations be represented as a function of unknown true or expected values.

The capital M with the subscript G in Equation 15 represents the mean square deviation of the normalized and weighted path coincident deviations, as evaluated with respect to the determined fitting function or considered approximations of the same. In accordance with the present invention, $M_G$ represents a constant value (or proportionality constant) which need not be included nor evaluated to determine maximum likelihood.

By assuming sample observation likelihood probability, to be proportional to the tailored weight factor at each respective function related observation point, and by also assuming a sufficient number of weighted samples to insure that the sum of the weighted deviations is representative of a Gaussian distribution, the associated likelihood estimators, as written to include tailored weighting to accommodate the respective probabilities of observation occurrence for path coincident deviations, can be approximated by Equation 16:

$$L_G \approx \prod_{k=1}^{K} \frac{1}{\sqrt{2\pi M_G}} e^{-\frac{W_{G_k} \mathcal{R}_{G_k}^2 (G-G)_k^2}{2\mathcal{V}_{G_k} M_G}}. \tag{16}$$

Like Equation 15, as considered in accordance with the present invention, forms of Equation 16 can only be considered approximate due to the fact that the mapping of the path/inversion intersection or path descriptor $\mathcal{G}$, for path coincident deviations, can be estimated but not actually be evaluated in correspondence with unknown true or expected points assumed to lie on the pre considered fitting function.

In accordance with the preferred embodiment of the present invention, for path coincident deviations, the tailored weight factors, $W_{G_k}$, may be defined as the square root of the sum of the squares of the partial derivatives of each of the independent variables as normalized on square roots of respective local variabilities, or as alternately rendered as locally representative of non-skewed homogeneous error distributions, said partial derivatives being taken with respect to the locally represented path designator $\mathcal{G}$ multiplied by a local skew ratio, $\mathcal{R}_G$, and normalized on the square root of the respectively considered type 1 deviation variability, $\sqrt{\mathcal{V}_G}$.

$$W_{G_k} = \sqrt{\sum_{i=1}^{N-1} \left( \frac{\partial X_i / \sqrt{\mathcal{V}_i}}{\partial \mathcal{R}_G \mathcal{G} / \sqrt{\mathcal{V}_G}} \right)^2}_{\mathcal{P}_k} \tag{17}$$

$$= \sqrt{\frac{\mathcal{V}_{G_k}}{\mathcal{R}_{G_k}^2} \sum_{i=1}^{N-1} \frac{1}{\mathcal{V}_{ik}} \left( \frac{\partial X_i}{\partial \mathcal{G}} \right)^2}_{\mathcal{P}_k}$$

wherein the sans serif subscript, i, implies representation of an independent variable. The k subscript indicates local evaluation or measurement corresponding to an observation comprising N dependent and independent variable sample measurements. In accordance with the present invention, both variability and skew ratio may be assumed to be functions of the observed phenomena as related to an ideal fitting function and associated data sampling and, therefore, considered as observation constants which can be removed from behind and placed in front of the differential sign. In accordance with the present invention, the terminology, as locally representative of a non-skewed homogeneous error distribution, is meant to imply representation as an element of a set or grouping of considered coordinate corresponding observation sample measurements of a same non-skewed homogeneous error distribution.

In accordance with the present invention, the fitting function and respective notation may be arranged to place alternate variables in position to be considered as dependent variables. For example, by replacing the subscript i of Equations 17 with the subscript j, to designate correspondence with both dependent and independent variables in the sum, the tailored weight factor can be alternately written as:

$$W_{G_k} = \sqrt{\sum_{i=1}^{N-1} \left( \frac{\partial X_i / \sqrt{\mathcal{V}_i}}{\partial \mathcal{R}_G \mathcal{G} / \sqrt{\mathcal{V}_G}} \right)^2}_{\mathcal{P}_k} \tag{18}$$

$$\sim \sqrt{\frac{\mathcal{V}_{G_d}}{\mathcal{R}_{G_d}^2} \left[ \frac{-1}{\mathcal{V}_d} \left( \frac{\partial X_d}{\partial \mathcal{G}_d} \right)^2 + \sum_{j=1}^{N} \frac{1}{\mathcal{V}_j} \left( \frac{\partial X_j}{\partial \mathcal{G}_d} \right)^2 \right]}_{\mathcal{P}_k}$$

wherein the dependent component is subtracted from the sum. The subscript d is included to designate a specific variable as the dependent variable. The respective path designator, $\mathcal{G}_d$, and mapped observation sample, G, need to be rendered accordingly.

With regard to consideration #3, to accommodate path-oriented data-point projections, one has to re-think the maximum likelihood estimator and establish likelihood as related to the deviation of possible fitting function representations from the observation samples, not as the deviation of the observation samples from unknown expected or true values along the function. With this alternate view of the deviation, in accordance with the preferred embodiment of the present invention, a representation of the respective mapping or path descriptor can be made by successive approximations, and for a deviation variability of type 2, the Gaussian distribution of Equation 1 may be replaced and more appropriately expressed by Equation 19:

$$D\left( \frac{W_G \mathcal{R}_G^2 (\mathcal{G} - G)^2}{2\mathcal{V}_G} \right) = \frac{1}{\sqrt{2\pi M_G}} e^{-\frac{W_G \mathcal{R}_G^2 (\mathcal{G}-G)^2}{2\mathcal{V}_G M_G}}. \tag{19}$$

Notice that the subscripts have been switch from what they were in Equation 15, indicating that the deviation variability of the data-point projections, as considered in Equation 19, is related to the independent variable sampling. The respective likelihood estimator can take the considered form of Equation 20, $$L_\mathcal{G} = \prod_{k=1}^{K} \frac{1}{\sqrt{2\pi M_\mathcal{G}}} e^{-\frac{W_{\mathcal{G}_k} \mathcal{R}_{\mathcal{G}_k}^2 (\mathcal{G}-G)_k^2}{2\mathcal{V}_{\mathcal{G}_k} M_\mathcal{G}}}. \tag{20}$$

In accordance with the present invention, for path-oriented data-point projections with deviation variability type 2, the tailored weight factors, $W_{\mathcal{G}_k}$, may be defined as the square root of the sum of the squares of the partial derivatives of each of the independent variables as normalized on square roots of respective local variabilities, or as alternately rendered as locally representative of non-skewed homogeneous error distributions, said partial derivatives being taken with respect to the locally represented path designator $\mathcal{G}$ multiplied by a local skew ratio, $\mathcal{RG}$, and normalized on the square root of the respectively considered type 2 deviation variability, $\sqrt{\mathcal{V}_\mathcal{G}}$.

$$W_{\mathcal{G}_k} = \sqrt{\sum_{i=1}^{N-1}\left(\frac{\partial X_i/\sqrt{\mathcal{V}_i}}{\partial \mathcal{R}_\mathcal{G}\mathcal{G}/\sqrt{\mathcal{V}_\mathcal{G}}}\right)^2_{\mathcal{P}_k}} \quad (21)$$

$$\leadsto \sqrt{\frac{\mathcal{V}_{\mathcal{G}_k}}{\mathcal{R}^2_{\mathcal{G}_k}}\sum_{i=1}^{N-1}\frac{1}{\mathcal{V}_{ik}}\left(\frac{\partial X_i}{\partial \mathcal{G}}\right)^2_{\mathcal{P}_k}}$$

$$\leadsto \sqrt{\frac{\mathcal{V}_{\mathcal{G}_d}}{\mathcal{R}^2_{\mathcal{G}_d}}\left[\frac{-1}{\mathcal{V}_d}\left(\frac{\partial X_d}{\partial \mathcal{G}_d}\right)^2 + \sum_{j=1}^{N}\frac{1}{\mathcal{V}_j}\left(\frac{\partial X_j}{\partial \mathcal{G}_d}\right)^2\right]_{\mathcal{P}_k}}$$

In accordance with the present invention, the respective form for a type 2 essential weight factor (i.e., an essential weight factor rendered to include type 2 deviation variability) may be represented as by Equations 22.

$$W_{\mathcal{G}_{dk}} \leadsto \frac{\mathcal{R}_{\mathcal{G}_d}}{\sqrt{\mathcal{V}_{\mathcal{G}_d}}}\sqrt{\left[\frac{-1}{\mathcal{V}_d}\left(\frac{\partial X_d}{\partial \mathcal{G}_d}\right)^2 + \sum_{j=1}^{N}\frac{1}{\mathcal{V}_j}\left(\frac{\partial X_j}{\partial \mathcal{G}_d}\right)^2\right]_{\mathcal{P}_k}}. \quad (22)$$

A similarly formulated type 1 essential weight factor (i.e., an essential weight factor rendered to include deviation variability type 1) may be formulated by replacing the type 2 deviation variability, $\mathcal{V}_{\mathcal{G}_d}$, in Equations 22 by type 1.

Referring back to both considerations #2 and #3, with regard to the tailoring of weight factors, in accordance with the present invention, respectively rendered deviations may be considered in general forms expressed by Equations 23 for path coincident deviations, $$\delta \mathsf{G}_k \approx \mathsf{G}_k - \mathcal{G}_k. \quad (23)$$

or expressed by Equations 24 for path-oriented data-point projections, $$\delta \mathcal{G}_k = \mathcal{G}_k - \mathsf{G}_k. \quad (24)$$

The mapped observation samples, $\mathsf{G}_k$, as included in Equations 24, may be represented without approximation as a function of both the dependent variable, $X_{dk}$, and independent variable data samples, $X_{ik}$ or $X_{jk}$, as well as the respectively determined dependent variable measure, $\mathcal{Y}_k$ or $\mathcal{X}_{dk}$, e.g.:

$$\mathsf{G}_k \leadsto \mathsf{G}_k(\mathcal{X}_{dk}, X_{1k}, \ldots, X_{dk}, \ldots, X_{N,k}), \quad (25)$$

wherein $$\mathcal{X}_{dk} = \mathcal{Y}_k(X_{1k}, \ldots, X_{ik}, \ldots, X_{N-1,k}). \quad (26)$$

In accordance with the present invention there may be one or more independent variables (e.g. for a two dimensional system, and for bicoupled variable pairs as might be associated with rendering forms of hierarchical regressions, the value of $N$ in Equations 25 and 26 would be two, providing for one dependent variable and only one independent variable.) Increasing the number of considered dimensions, as designated by the value of $N$, will increase the specified number of independent variables.

Because the path coincident deviations must be considered as an approximation of the deviation of the data sample from an assumed mean point on the fitting function, the validity of Equations 23 depends upon how closely the mapped observation samples, $\mathsf{G}_k$, can be estimated as a function of sampled data coordinates. In accordance with the present invention, the mapped observation sample may be alternately rendered as a function of pre-estimated fitting parameters and held constant during successive optimizing manipulations. (This restraint upon the mapped observation sample may be more applicable when considering the deviation of the function from the data than when considering the path coincident deviations of the data from an unknown function location.)

In accordance with the present invention, there are at least three differences between the path coincident deviations rendered by Equations 23 and the path-oriented data-point projections as expressed by Equations 24. These are:

1. Because of opposite orientation, i.e. from the fitting function to the data-point v.s. from the data-point to the fitting function, the sign of the deviations is not the same. The path coincident deviations represent an estimate of the deviations of the data from a true or expected value, while the data-point projections represent the deviation of the fitting function from the data point along the projection path. In accordance with the present invention, the directed displacement and associated sign convention may be reversed and alternately included in correspondence with considered convention without affect upon the magnitude or square of the resulting deviations, provided that in considering certain forms of weighted deviations the same convention is maintained throughout the generating of the associated weight factors.

2. The dependent variable cannot be evaluated as a function of an unknown true or expected variable, hence for errors-in-variables applications, the path coincident deviations being evaluated with respect to sampled data can only represent an approximation, while the precision of the evaluations of mappings in correspondence with the path/fitting function intersections of respective data-point projections are limited only by analytical representation and computational accuracy.

3. The variability of path coincident deviations is determined in correspondence with the considered variability in the deviations of the dependent variable measurements, while the variability of the respective data-point projections will correspond to that of representing the path/fitting function intersection and should be generated as a function of the variability in the deviations of the independent variables.

Note that the only difference between the tailored weight factors, as defined for path coincident deviations by Equations 17 or 18, and the tailored weight factors, as defined for path-oriented data-point projections by Equations 21, is in the representation of the dependent coordinate deviation variability. In accordance with the present invention, for path coincident deviations, said deviation variability, $\mathcal{V}_{\mathsf{G}_{dk}}$, should be represented by an estimate for a non-skewed variability corresponding to a respective representation for a dependent variable sample. In accordance with the present invention, for data-point projections, said deviation variability, $\mathcal{V}_{\mathsf{G}_{dk}}$, should be an estimate of the dispersion in a determined value for a representation of a dependent variable with said representation for a dependent variable assumed to be characterized by a non-skewed uncertainty distribution and with said dispersion excluding the direct addition of the variability in said non-skewed representation of the dependent variable.

In accordance with the present invention, normalization of independent variables is not required for the case of non-skewed homogeneous error distributions in respective sample measurements. For completely general application, in accordance with the present invention, the calligraphic $\mathcal{G}$ may alternately represent any path designator which is considered typical of a residual, characteristic deviation, or data-point projection, which is assumed, considered, mapped, transformed, or normalized to be represented by a homogeneous non-skewed error distribution or which is assumed, considered, mapped, transformed, or normalized to be represented by a homogeneous non-skewed error distribution when normalized on the square root of a respective dependent coordinate deviation variability, $\mathcal{V}_{\mathcal{R}}$, and/or when multiplied by a considered skew ratio, $\mathcal{R}$.

In accordance with the present invention, the implementing of the analytic code of Equations 17, 18, or 21, in the formulating of tailored weight factors, and the implementing of essential weight factors type 2 as exemplified by Equations 22 or essential weight factors type 1, as may be alternately rendered, provide novel weighting of reduction deviations, which may be subject to orthogonal variable uncertainties and/or constraints, including novel weighting of normal deviations and normal data-point projections for errors-in-variables processing and novel weighting for alternately defined deviation paths.

In addition to the concepts heretofore discussed, a major problem that arises with maximum likelihood models is due to the non-orthogonality of solution sets that may be characterized by a fitting function. Unlike orthogonal transforms in which included functions can represent independent components, fitting functions, as considered to be parametric function families, are characterized by fitting parameters which can be represented by a number of evaluation sets, each set appearing to render the fitting function to fit the data, but each set being represented by alternate fitting parameter evaluations. Often the bias of the data or the inclusion of a coordinate offset can prevent conversion or lead to an incorrect evaluation set. To alleviate the problem at least to some degree, in accordance with the present invention, any one or combinations of three alternate approaches might be considered. These are:
1. Bicoupled variable measurements can be considered in hierarchical order, and for many applications, respective bivariate regressions can be rendered.
2. Essential weight factors can be rendered to combine a limited number of squared bivariate reduction deviations in rendering a multivariate sum for the simultaneous evaluating of respective coordinate related fitting parameter estimates.
3. Alternate likelihood estimators can sometimes be combined to add controlling constraints which can filter out at least some of the spurious evaluation sets and allow for more likely representation of an appropriate inversion.
In accordance with the present invention, processing techniques, such as rendering likelihood as related to path-oriented data-point projections as considered herein, as well as alternate schemes for processing path coincident deviations in accordance with the present invention, may be combined by various techniques to provide additional fitting parameter constraints and thus allow for enhanced evaluation.

Comparison with Prior Art

The term "errors-in-variables" has been coined by many to refer to observations which reflect errors in both dependent and independent variable sampling. In 1966, York suggested an approach wherein uncertainties in variable measurements might be based upon the "experimenter's estimates" (Ref. Derek York, "Least-Squares Fitting of a Straight Line," Canadian Journal of Physics, 44, pp. 1079-1086, 1966.) He attempted to allow (or at least imply allowance) for the heterogeneous representation of individual sample weighting when, as he put it: "errors in the coordinates vary from point to point with no necessarily fixed relation to each other." York proposed what he refers to as "an exact treatment of the problem". Unfortunately, he along with others that followed has not considered the effects of transverse trans-lation of nonlinearities and heterogeneous probability densities on respective probabilities of observation occurrence being imposed during least-squares or maximum likelihood optimizing. What York actually came up with was a model for multivariate errors-in-variables line regression analysis as restricted to the assumptions of non-skewed, statistically independent, homogeneous distributions of measurement error. Considering the limit of the York model as the errors in the measurement of the independent variables approach zero would yield the same form as Equations 6 of the present disclosure, with the mean squared deviations being allowed to vary independently, which in accordance with the present invention, will only establish maximum likelihood as restricted to the explicit form of Equation 3.

Within the space of a year and a half after the publication of "Least-squares Fitting of a Straight Line" by York, Clutton-Brock published his work on "Likelihood Distributions for Estimating Functions when Both Variables are Subject to Error" (Ref. Technometrics 9, No. 2, pp. 261-269 1967.) By assuming small errors in the measurement of the system variable, herein represented as $\mathcal{X}$, and implementing a residual deviation to include normalization on effective variance, Clutton-Brock attempted to characterized a general first order approximation, providing a nonlinear model for errors-in-variables maximum likelihood estimating. The model of Clutton-Brock, as applied to line regression analysis, is completely consistent with the York line regression. When the York nomenclature for the combined weight of coordinate related datum samples is replaced with the inverse of a respective variance estimate, it becomes evident that there is little difference between the York solution and the nonlinear effective variance solution as adapted for line regression analysis by Clutton-Brock, with exception that York left specification of the explicit form for uncertainty to the analyst. For assumed statistically independent homogeneous sampling and at least proportionate representation of uncertainty, both the York and alternate least-squares renditions in which squared residual deviations are rendered as normalized on effective variance should provide generally adequate line regression analysis. Equation 27 provides a simple Multidimensional definition of "effective variance," $\upsilon_d$, which can be considered compatible with the two dimensional models considered by both York and Clutton-Brock:

$$u_d = \sum_{v=1}^{N} \left[ \sigma_v \frac{\partial \mathcal{X}_d}{\partial \mathcal{X}_v} \right]_P^2. \tag{27}$$

The $\mathcal{X}_v$ represents variables corresponding to each of the considered degrees of freedom. The subscript v designates the respective variable. The $\mathcal{X}_d$ represents the currently considered dependent variable, and the subscript d designates which variable is so considered. The $\sigma_v$ represents the standard deviation corresponding to the measurement of the respective variable degree of freedom. The subscript P indicates evaluation with respect to the undetermined fitting parameters and thus incorporates the effective variance as here defined to be included in the minimizing process.

A classic geometric derivation of line regression analysis is presented in a 1989 publication by Neri, Saitta, and Chiofalo (ref. "An accurate and straightforward approach to line regression analysis of error-affected experimental data" Journal of Physics E: Scientific Instruments. 22, pp. 215-217, 1989.) In this derivation, the effective variance is presented, not as a weight factor, which would necessarily be held constant during maximizing or minimizing operations, but as a form of geometric conversion factor which repositions and redefines the vectors which correspond to normalized residual deviations to reflect a mean orientation related to the distribution of errors in the respective variables.

Considering the above mentioned work of Neri, Saitta, and Chiofalo, along with their several predecessors, it becomes hopeful that dividing a residual by the square root of effective variance will geometrically transform the residual to correspond to a mean orientation between the line and the respective data point, thereby becoming an inherent part of a representative single component reduction deviation, comprising a representation for the vector sum of both dependent and independent sample deviations. As such, and thus considered in accordance with the present invention, the "effective variance" should not be categorized as a weight factor, but rather an integral part of a transformed single component deviation. Therefore, and in agreement with the works of York and Clutton-Brock, the "effective variance" so used must be considered variant during minimizing or maximizing operations. With exception of the methods of inversion and approach in derivation, the model described by Neri, Saitta, and Chiofalo is not significantly different from the line regression model which is described in the work of York; And the expansion of the Neri, Saitta, and Chiofalo model to nonlinear applications (ref. Neri, Saitta, and Chiofalo, "An accurate and straightforward approach to line regression analysis of error-affected experimental data" Journal of Physics E: Scientific Instruments. 22, pp. 215-217, 1989) is not significantly different from the nonlinear model proposed earlier by Clutton-Brock.

Consider a typical approximation for two dimensional normal component reduction deviations, $\delta_{E_d}$, as related to multidimensional slope-constant (or linear) fitting function applications by Equation 28, $$\delta_{E_d} \approx \frac{X_d - \mathcal{X}_d}{\sqrt{\sum_{v=1}^{N} \sigma_v \left(\frac{\partial \mathcal{X}_d}{\partial \mathcal{X}_v}\right)^2}}, \tag{28}$$

with a sum of squared deviations being represented for errors-in-variables maximum likelihood estimating by Equation 29, $$\xi_{E_d} \approx \sum_{k=1}^{K} \left(\frac{X_d - \mathcal{X}_d}{\sqrt{\sum_{v=1}^{N} \left(\sigma_v \frac{\partial \mathcal{X}_d}{\partial \mathcal{X}_v}\right)^2}}\right)^2_{P_k}. \tag{29}$$

The sans serif subscript, E, suggests normalization on effective variance; the sans serif $X_d$ represents sample measurements for the dependent variable being designated by the subscript d; and the calligraphic $\mathcal{X}_d$ represents the system dependent variable being evaluated as a function of respective independent variable sample measurements. The $k$ subscript designates a specific data sample. (Note that, in accordance with the present invention, the terminology "slope-constant" is herein applied to regressions in which the dependent variable is a linear function of respective independent variables. Note also that, in accordance with the present invention, the terminology "slope-constant regression analysis" and "multivariate slope-constant regression analysis" is herein considered to include bivariate line regression analysis.) The approximation sign is included in Equations 28 and 29 due to the limitation of being unable to express path coincident deviations in direct correspondence with expected values for errors-in-variables applications.

Note that as the errors in the sampling of independent variables approach zero, the form of the inversion, as provided by Equations 28 and 29, will be the same as that provided by Equations 3 through 6 and thus must satisfy the restraints of the maximum likelihood estimator, which is expressed by Equation 3 and which does not necessarily guarantee representation for nonlinear or heterogeneous data sampling.

In accordance with the present invention, a normal deviation may be defined as a displacement normal to the fitting function, as expressed in coordinates normalized on the considered sample variability. The normal deviation, so defined, will most generally represent the shortest distance between a data point and the fitting function, as represented in said coordinates as so normalized. It should be noted, however, that in regions of curvature, there may be more than one normal to the fitting function that will pass through a respective data point.

In accordance with the present invention, a normal component reduction deviation can be alternately approximated for multivariate slope-constant regression analysis by Equation 30:

$$\delta_{E_d} \approx \frac{X_d - \mathcal{X}_d}{\sqrt{\sum_{v=1}^{N} \mathcal{V}_v \frac{\partial \mathcal{X}_d^2}{\partial \mathcal{X}_v}}}, \tag{30}$$

and a respective sum of squared deviations may be represented as $$\xi_{E_d} = \sum_{k=1}^{K} \left(\frac{X_d - \mathcal{X}_d}{\sqrt{\sum_{v=1}^{N} \mathcal{V}_v \frac{\partial \mathcal{X}_d^2}{\partial \mathcal{X}_v}}}\right)^2_{P_k}. \tag{31}$$

Note that the representation for standard deviation within Equations 28 and 29 is replaced in Equations 30 and 31 by the square root of a variability, $\mathcal{V}_v$.

Traditionally, maximum likelihood estimating, as well as statistics on the whole, has been based upon the concept of deviations of data from true or expected values. It is often assumed that normalization, being included as an effective variance, may be sufficient. Such is not necessarily the case. Even though arbitrary sums of non-skewed error distributions can be statistically considered to be represented by Gaussian distributions, and even though the uncertainty in all of the included sample measurements may be considered to be represented by non-skewed error distributions due to the fact that a deviation divided by the square root of an effective variance and thus considered as normalized on or with respect to effective variance, does not represent an actual displacement between the true or expected value and the respective sample data point, it may require additional normalization, and alternate expressions or approximations may certainly be considered.

In accordance with the present invention, a possibly more valid but apparently unexplored concept is based upon the deviations of projected values from sample measurements. Both represent equivalent displacement magnitude, whether considered positive or negative. When squared and included to represent a sum of squared deviations, without respective weighting, they will be the same. The difference lies in representing the variability of the deviations being considered when errors occur in the measurement of more than a single variable. The variability of assumed path coincident or considered residual deviations will correspond directly to a variability in the measurement of the sampled data point, which is dependent upon the accuracy of observation sampling and recording. In accordance with the present invention, the variability of a data-point projection or a dependent coordinate mapping of the same can alternately be considered to exclude the variability in the measurement of the dependent variable.

Based upon the derivation of and proof of maximum likelihood, which is provided in U.S. Pat. No. 7,107,048 under the heading "Alternate Single Component Likelihood Estimators," also, due to the fact that for errors in the measurement of more than one variable the derivation is based upon the deviation of the data point from an unknown expected value, the data points, once recorded, should be considered invariant. It is the fitting function positioning that must be treated as variant when considering the variability for errors-in-variables applications. Said U.S. Pat. No. 7,107,048 suggests the representation of likelihood as related to data-point projections between data points and inversion conforming data sets, with said projections aligned along respectively orthogonal, individually represented datum coordinates (as illustrated and discussed in the detailed description of the invention and respective FIG. 1 of "Inversion Conforming Data Sets Processing" ref. ibid.) In accordance with the present invention, alternate data-point projection paths may be considered.

Inversion-conforming Data sets are defined in U.S. Pat. No. 7,107,048 as " . . . approximation-conforming data sets which correspond to the projection of acquired data points (e.g., coordinates, counts, measurements, or alternately acquired data-point defining sets) along corresponding coordinates onto the locus or alternate confines of an approximating relationship, said approximating relationship being rendered as or in correspondence with a respective data inversion or a considered estimate of the same."

Approximation-conforming data sets are defined in said U.S. Pat. No. 7,107,048 as "points that are restricted to the confines (i.e., locus, or confining restraints) of a respective approximating relationship."

Claim 1 of said U.S. Pat. No. 7,107,048 includes concepts that:
1. each data-point projection extends from respective data-point coordinates to intersect an approximating relationship;
2. intersections of said data-point projections with said approximating relationship substantially establish respective inversion-conforming data sets which comprise projected coordinates for points that conform to a corresponding data inversion at respective said intersections;
3. each of said sets of projected coordinates comprise a respective subset of corresponding said data-point coordinates and at least one parametrically determined variable measure;
4. each said parametrically determined variable measure is determined in correspondence with said approximating relationship and at least one data-point coordinate of said respective subset;
5. said approximating relationship establishes respective correspondence between said at least one data-point coordinate and said at least one parametrically determined variable measure; and
6. said approximating relationship being determined in correspondence with a parametric approximative form and at least one parameter estimate.

In accordance with the present invention, the processing of path conforming data set mappings establishes an alternate approach to that of inversion conforming data sets processing, as defined in said U.S. Pat. No. 7,107,048. In accordance with the present invention, said mappings comprise coordinates, e.g. $(g_k, X_{1k}, \ldots X_{ik}, \ldots, X_{N-1,k})$ or more conveniently, in accordance with the preferred embodiment of the present invention, said mappings may comprise coordinates $(X_{1k}, \ldots, g_{dk}, \ldots, X_{Nk})$ in which the dependent variable and respective coordinate mapping may be represented by alternate system variables. In accordance with the present invention, said coordinate mappings establish a dependent coordinate representation of the location of path/fitting function intersections (or approximations of the same) as a function of more than a single variable, said mappings being estimated by a succession of approximations, thus allowing for the expression of likelihood in correspondence with "path-oriented data-point projections" along simulated or assumed data representative displacement paths.

In accordance with the present invention, the alignment of path-oriented data-point projections can be alternately rendered to correspond to normal displacements.

In accordance with the present invention, normal path-oriented data-point projections can be extended from each data point to the respective fitting function along a normal to said fitting function, and, in lieu of inversion conforming data sets, "projection mapping data sets" i.e. $(X_1 \ldots X_{d-1}, N_{dk}, X_{d+1}, \ldots, X_N)$ can be represented in correspondence with points of intersection of said normal and said function.

In accordance with the present invention, the definition of data-point projections can be broadened to also include mappings of projections along the normal to the considered fitting function or other pre-determined deviation paths, thus providing alternate means for the normalization and weighting of normal or alternate displacement. In accordance with the present invention, essential weighting of normal displacement can be implemented to establish weighting of squared normal components for applications which involve nonlinear and/or heterogeneous sampling of data. In accordance with the present invention, essential weighting of path-oriented displacements can be implemented to establish weighting of squared path-oriented deviations components for applications which involve nonlinear and/or heterogeneous sampling of data. In addition, in accordance with the present invention, by combining alternately considered dependent variable representations of data-point projections and/or residual displacements, additional restraints can be imposed to provide for improved solution set screening and/or the improved evaluation of biased offsets. U.S. patent application Ser. No. 11/266,224, now U.S. Pat. No. 7,383,128, suggests use of a composite weight factor comprising the product of a coefficient and a "fundamental weight factor," said fundamental weight factor being rendered without consideration of any form of skew ratio. The fundamental weight factor is based upon likelihood of a multidimensional residual error deviation from the true or expected location, assuming said likelihood to be related to the $N^{th}$ root of an associated $N$ dimensional deviation space. The concept may be valid as considered for a limited number of application, but generally, in light of the fact that said true or expected location is indeterminate, it must be recognized as unreliable or spurious. For purposes of comparison, a similarly spurious composite weight factor, $Cw$, may be rendered, in accordance with the present invention by:

1. replacing said fundamental weight factor by an alternate weight factor, w, rendered to include representation of said skew ratio, and 2. by including an appropriate coefficient, $\mathcal{C}$.

Said similarly spurious composite weight factor, here dubbed "cursory weight factor," being rendered in accordance with the present invention, can be represented for path coincident deviations by Equations 32, $$C_{w_{E_{dk}}} \curvearrowright \tag{32}$$

$$\left| \frac{\mathcal{R}_{E_{dk}}^2}{\mathcal{V}_{E_{dk}}} \prod_i \frac{1}{\mathcal{V}_{ik}} \left[ \frac{\left(\frac{\partial X_d}{\partial X_i}\right)_k}{\sqrt{\sum_{v=1}^N \mathcal{V}_{vk}\left(\frac{\partial X_d}{\partial X_v}\right)_k^2}} - \frac{(X_{dk} - X_{dk})\sum_{v=1}^N \mathcal{V}_{vk}\left(\frac{\partial X_d}{\partial X_v}\frac{\partial^2 X_d}{\partial X_i \partial X_v}\right)_k}{\sqrt{\sum_{v=1}^N \mathcal{V}_{vk}\left(\frac{\partial X_d}{\partial X_v}\right)_k^2}^3} \right]^{-2} \right|_\mathcal{P}^{\frac{1}{N}},$$

or by Equations 33 for path-oriented data-point projections with the type 1 deviation variability, $\mathcal{V}_{E_4}$, replaced by the type 2.

$$C_{w_{E_{dk}}} \curvearrowright \tag{33}$$

$$\left| \frac{\mathcal{R}_{E_{dk}}^2}{\mathcal{V}_{E_{dk}}} \prod_i \frac{1}{\mathcal{V}_{ik}} \left[ \frac{\left(\frac{\partial X_d}{\partial X_i}\right)_k}{\sqrt{\sum_{v=1}^N \mathcal{V}_{vk}\left(\frac{\partial X_d}{\partial X_v}\right)_k^2}} - \frac{(X_{dk} - X_{dk})\sum_{v=1}^N \mathcal{V}_{vk}\left(\frac{\partial X_d}{\partial X_v}\frac{\partial^2 X_d}{\partial X_i \partial X_v}\right)_k}{\sqrt{\sum_{v=1}^N \mathcal{V}_{vk}\left(\frac{\partial X_d}{\partial X_v}\right)_k^2}^3} \right]^{-2} \right|_\mathcal{P}^{\frac{1}{N}}.$$

Another spurious form, $C_W$, of cursory weight factor, in which to represent deviations in path designators consistent with multidimensional path-oriented displacements in accordance with the present invention may be rendered by Equations 34 and 35:

$$C_{w_{E_{dk}}} \curvearrowright \tag{34}$$

$$\left| \frac{\mathcal{R}_{E_{dk}}^2}{\mathcal{V}_{E_{dk}}} \prod_i \frac{1}{\mathcal{V}_{ik}} \left[ \frac{\left(\frac{\partial X_d}{\partial X_i}\right)_k}{\sqrt{\sum_{v=1}^N \mathcal{V}_{vk}\left(\frac{\partial X_d}{\partial X_v}\right)_k^2}} - \frac{(X_{dk} - X_{dk})\sum_{v=1}^N \mathcal{V}_{vk}\left(\frac{\partial X_d}{\partial X_v}\frac{\partial^2 X_d}{\partial X_i \partial X_v}\right)_k}{\sqrt{\sum_{v=1}^N \mathcal{V}_{vk}\left(\frac{\partial X_d}{\partial X_v}\right)_k^2}^3} \right]^{-2} \right|_\mathcal{P}^{\frac{1}{N}},$$

and $$C_{w_{E_{dk}}} \curvearrowright \tag{35}$$

$$\left| \frac{\mathcal{R}_{E_{dk}}^2}{\mathcal{V}_{E_{dk}}} \prod_i \frac{1}{\mathcal{V}_{ik}} \left[ \frac{\left(\frac{\partial X_d}{\partial X_i}\right)_k}{\sqrt{\sum_{v=1}^N \mathcal{V}_{vk}\left(\frac{\partial X_d}{\partial X_v}\right)_k^2}} - \frac{(X_{dk} - X_{dk})\sum_{v=1}^N \mathcal{V}_{vk}\left(\frac{\partial X_d}{\partial X_v}\frac{\partial^2 X_d}{\partial X_i \partial X_v}\right)_k}{\sqrt{\sum_{v=1}^N \mathcal{V}_{vk}\left(\frac{\partial X_d}{\partial X_v}\right)_k^2}^3} \right]^{-2} \right|_\mathcal{P}^{\frac{1}{N}}$$

wherein a spurious replacement for tailored weight factors, $W_{G_k}$, here dubbed "spurious weight factors," may be alternately defined, in accordance with the present invention for path coincident deviations, as the inverse of the $N^{th}$ root of the square of the product of partial derivatives of the locally represented path designator $\mathcal{G}$ multiplied by a local skew ratio, $\mathcal{R}_G$, and normalized on the square root of the respectively considered deviation variability, $\sqrt{\mathcal{V}_G}$, said partial derivatives being taken with respect to each of the independent variables as normalized on square roots of respective local variabilities, or as alternately rendered as locally representative of non-skewed homogeneous error distributions:

$$W_{G_k} = \left| \prod_{i=1}^{N-1} \frac{\partial \mathcal{R}_G \mathcal{G} / \sqrt{\mathcal{V}_G}}{\partial X_i / \sqrt{\mathcal{V}_i}} \right|_{\mathcal{P}_k}^{-\frac{2}{N}} = \left| \prod_{i=1}^{N-1} \frac{\mathcal{R}_{G_k} \sqrt{\mathcal{V}_{ik}}}{\sqrt{\mathcal{V}_{G_k}}} \left(\frac{\partial \mathcal{G}}{\partial X_i}\right)_k \right|_{\mathcal{P}}^{-\frac{2}{N}}. \tag{36}$$

And, in accordance with the present invention, spurious weight factors, $W\mathcal{G}_k$, may be defined, for path-oriented data-point projections with deviation variability type 2, as the inverse of the $N^{th}$ root of the square of the product of partial derivatives of the locally represented path designator $\mathcal{G}$ multiplied by a local skew ratio, $\mathcal{R}\mathcal{G}$, and normalized on the square root of the respectively considered dependent component deviation variability, $\sqrt{\mathcal{V}_\mathcal{G}}$, and taken with respect to each of the independent variables as normalized on square roots of respective local variabilities, or as alternately rendered as locally representative of non-skewed homogeneous error distributions.

$$W_{\mathcal{G}_k} = \left( \prod_{i=1}^{N-1} \frac{\partial \mathcal{R}_\mathcal{G} \mathcal{G} / \sqrt{\mathcal{V}_\mathcal{G}}}{\partial X_i / \sqrt{\mathcal{V}_i}} \bigg|_{\mathcal{P}_k} \right)^{-\frac{2}{N}} \quad (37)$$

$$= \left| \prod_{i=1}^{N-1} \frac{\mathcal{R}_{\mathcal{G}_k} \sqrt{\mathcal{V}_{ik}}}{\sqrt{\mathcal{V}_{\mathcal{G}_k}}} \left( \frac{\partial \mathcal{G}}{\partial X_i} \right)_k \bigg|_{\mathcal{P}} \right|^{-\frac{2}{N}}.$$

Equations 32 and 34, as representative of deviations from an estimated true or expected value, must be recognized as only an approximation for errors-in-variables application. On the other hand, Equations 33 and 35 become invalid unless there are errors in more than a single variable. One might note that in the real world, whether it be in the sampling of data or the manipulating of data, there is no such thing as error-free data, hence for all practical purposes, even when the errors seem to be insignificant, all coordinate samples should be able to be represented as error affected.

The products which are included in Equations 32 through 37 and in similar representations of U.S. Pat. Nos. 5,619,432; 5,652,713; 5,884,245; and 7107048 might be consistent with representing likelihood of multi-coordinate deviation displacement from explicit expected values by a root value of slope related deviation space, but said products are not consistent with the likelihood associated with assumed path-oriented data-point projections, as rendered in accordance with the present invention. Both concepts must be considered as spurious, except as limited to two degrees of freedom.

Although Equation 32 through 37, along with other similar space related representations, may provide appropriate solutions for a number of applications, there seem to be two basic concerns:

1. Speaking generally, in accordance with the preferred embodiment of the present invention, path related deviations for systems of more than two dimensions should be considered as independently related to each of the independent orthogonal coordinates. For example, consider the intersection of a line with a two dimensional surface in a three dimensional coordinate system comprising coordinates (x, y, z) with an intersection at the origin point $(x_o, y_o, z_o)$ designated by the subscript o, where z is a function of x and y. The equations for the normal line to the surface would be:

$$\frac{x - x_o}{\left( \frac{\partial z}{\partial x} \right)_o} = \frac{y - y_o}{\left( \frac{\partial z}{\partial x} \right)_o} = \frac{z - z_o}{-1}. \quad (38)$$

In accordance with the present invention, attempts to represent a deviation path for more than two dimensions may be overly optimistic and, consequently, invalid for other than linear applications. To compensate for this anomaly, at least for multivariate applications, a form of sequential or hierarchical regressions may be employed which will limit regressions to two dimensions; however for certain applications, coordinate related sampling is independent, and hence no unique bivariate hierarchical order can be represented.

2. As the number of parameters and associated degrees of freedom increase, the likelihood of rendering a proper solution set decreases. For many applications, implementation of a form of hierarchical regressions may be both feasible and consistent with the current state of the art. Assuming there is an order in which coordinate related sample measurements are taken, a sequence of bicoupled regressions may be established, being based upon a concept of antecedent measurement dispersions, where the dependent variable of the first regression and each subsequent regression is a function of only one independent variable, and where the independent variable of each subsequent regression is the dependent variable that was or will be determined by the preceding regression, with the dispersion accommodating variability being tracked from regression to regression.

Implementing a technique of sequential or hierarchical regressions with essential weighting, as rendered in accordance with the present invention for alternate deviation paths, may improve performance by reducing both the number of degrees of freedom being simultaneously evaluated and the number of associated fitting parameters corresponding to each level of evaluation. To render tailored weight factors for such hierarchical applications as might be considered, the typewriter type N, as included in Equations 13 through 37 and in certain equations to follow, can be alternately rendered to represent the number of variables in a subset of two or more system variables which are being included to simultaneously render fitting parameters corresponding to a single hierarchical regression level, and coordinate related components can be combined to render multivariate likelihood estimators in correspondence with respective multivariate hierarchical levels. In accordance with the present invention, essential weight factors may serve as a suitable replace for the weight factors previously considered.

In accordance with the present invention, by implementing essential weighting of bicoupled component related paths, alternately formulated estimators can be established for both bivariate and multivariate hierarchical level applications. In the U.S. patent application Ser. No. 11/266,224, now U.S. Pat. No. 7,383,128, provision is considered for handling unquantifiable dependent variable representations and representing multivariate observations as related to two dimensional segment inversions. In that U.S. Patent application, a form of inversion conforming data sets processing is suggested for the considered data inversions. In accordance with the present invention, inversions associated with essential weighting of path related deviations may more likely provide results.

To establish form for essential weight factors in accordance with the present invention, unit-less variable related effective variance path designators, E, can be rendered as the function portion of the deviations of Equation 30, as in Equation 39, $$E_d = \frac{X_d}{\sqrt{\sum_{v=1}^{N} \mathcal{V}_v \frac{\partial X_d^2}{\partial X_v}}}, \quad (39)$$

and corresponding representation for the respectively mapped observation sample is provided by Equation 40:

$$E_d = \frac{X_d}{\sqrt{\sum_{v=1}^{N} \mathcal{V}_v \frac{\partial X_d^2}{\partial X_v}}}. \quad (40)$$

The dependent component deviation variabilities, type 1 and type 2, $\mathcal{V}_{E_d}$ and $\mathcal{V}_{E_d}$, may be approximated in correspondence with Equations 41 and 42 respectively:

$$\mathcal{V}_{E_{dk}} = \mathcal{V}_{dk}, \quad (41)$$

and $$\mathcal{V}_{E_{dk}} = \left( -\mathcal{V}_d \frac{\partial X_d^2}{\partial X_d} + \sum_{\ell=1}^{N} \mathcal{V}_\ell \frac{\partial X_d^2}{\partial X_\ell} \right)_{\mathcal{P}_k}. \quad (42)$$

Assuming the deviations of dependent variable samples, $X_{dk}$, as individually considered to be characterized by non-skewed uncertainty distributions, said distributions being proportionately represented by a corresponding datum variability, $V_{dk}$, the non-skewed form for the dependent variable deviation variability would be equal to the deviation, $X_{dk} - \mathcal{X}_{dk}$. A skew ratio for the respective deviations would be expressed as the ratio of the non-skewed dependent variable sample deviations to the assumed normal component reduction deviations:

$$\mathcal{R}_{E_d k} = \left( \frac{X_d - \mathcal{X}_d}{\delta_{E_d}} \right)_{\mathcal{P}_k} \tag{43}$$

$$= \left( \frac{X_d - \mathcal{X}_d}{\frac{X_d - \mathcal{X}_d}{\sqrt{\sum_{v=1}^{N} \mathcal{V}_v \frac{\partial \mathcal{X}_d^2}{\partial X_v}}}} \right)_{\mathcal{P}_k}$$

$$= \left( \sqrt{\sum_{v=1}^{N} \mathcal{V}_v \frac{\partial \mathcal{X}_d^2}{\partial X_v}} \right)_{\mathcal{P}_k}.$$

In accordance with the present invention, the skew ratios and, as necessary, variabilities are evaluated in correspondence with successive estimates for the fitted parameters, $\mathcal{P}$, being held constant during successive optimization steps of the maximum likelihood estimating process.

In accordance with the present invention, by incorporating the dependent component deviation variability type 1 of Equations 41 along with the skew ratio of Equations 43, the essential weight factors for the square of associated path coincident deviations can take the form of Equations 44:

$$\mathcal{W}_{E_{dk}} \sim \frac{\mathcal{R}_{E_d}}{\sqrt{\mathcal{V}_{E_d}}} \sqrt{\left[ \frac{-1}{\mathcal{V}_d} \left( \frac{\partial \mathcal{X}_d}{\partial E_d} \right)^2 + \sum_{j=1}^{N} \frac{1}{\mathcal{V}_j} \left( \frac{\partial \mathcal{X}_j}{\partial E_d} \right)^2 \right]_{\mathcal{P}_k}} \tag{44}$$

$$= \sqrt{ \left[ \frac{\frac{-\mathcal{R}_{E_d}^2}{\mathcal{V}_d \mathcal{V}_{E_d}}}{\left[ \sqrt{\sum_{v=1}^{N} \mathcal{V}_v \left( \frac{\partial \mathcal{X}_d}{\partial X_v} \right)^2} \right]^2} + \sum_{j=1}^{N} \left[ \frac{\frac{\mathcal{R}_{E_d}^2}{\mathcal{V}_j \mathcal{V}_{E_d}}}{\left( \frac{\partial \mathcal{X}_d}{\partial X_j} \right)} - \frac{\mathcal{X}_d \sum_{v=1}^{N} \mathcal{V}_v \left( \frac{\partial \mathcal{X}_d}{\partial X_v} \frac{\partial^2 \mathcal{X}_d}{\partial X_j \partial X_v} \right)}{\left[ \sqrt{\sum_{v=1}^{N} \mathcal{V}_v \left( \frac{\partial \mathcal{X}_d}{\partial X_v} \right)^2} \right]^3} \right]^2 \right]_{\mathcal{P}_k}}.$$

In accordance with the present invention, the essential weight factors for weighting the squares of respective path-oriented data-point projections will take a similar form, but with the type 1 deviation variability, $\mathcal{V}_{E_d}$, replaced by the type 2, $\mathcal{V}_{E_d}$, e.g., $$\mathcal{W}_{E_{dk}} \sim \frac{\mathcal{R}_{E_d}}{\sqrt{\mathcal{V}_{E_d}}} \sqrt{\left[ \frac{-1}{\mathcal{V}_d} \left( \frac{\partial \mathcal{X}_d}{\partial E_d} \right)^2 + \sum_{j=1}^{N} \frac{1}{\mathcal{V}_j} \left( \frac{\partial \mathcal{X}_j}{\partial E_d} \right)^2 \right]_{\mathcal{P}_k}} \tag{45}$$

$$= \sqrt{ \left[ \frac{\frac{-\mathcal{R}_{E_d}^2}{\mathcal{V}_d \mathcal{V}_{E_d}}}{\left[ \sqrt{\sum_{v=1}^{N} \mathcal{V}_v \left( \frac{\partial \mathcal{X}_d}{\partial X_v} \right)^2} \right]^2} + \sum_{j=1}^{N} \left[ \frac{\frac{\mathcal{R}_{E_d}^2}{\mathcal{V}_j \mathcal{V}_{E_d}}}{\left( \frac{\partial \mathcal{X}_d}{\partial X_j} \right)} - \frac{\mathcal{X}_d \sum_{v=1}^{N} \mathcal{V}_v \left( \frac{\partial \mathcal{X}_d}{\partial X_v} \frac{\partial^2 \mathcal{X}_d}{\partial X_j \partial X_v} \right)}{\left[ \sqrt{\sum_{v=1}^{N} \mathcal{V}_v \left( \frac{\partial \mathcal{X}_d}{\partial X_v} \right)^2} \right]^3} \right]^2 \right]_{\mathcal{P}_k}}.$$

Note that Equations 32 and 33 are not only different from Equations 44 and 45 in concept of design, but they do not even provide equivalent results when considered for two dimensional applications. Equations 34 and 35, as modified in accordance with the present invention may provide equivalent results for two dimensional applications; however they can hardly be recognized as valid for more than two degrees of freedom when based upon assumed error deviations being represented in correspondence with unknown expected values.

Essential weight factors, which are rendered in accordance with the present invention, are apparently novel and unique, being rendered to weight path designated deviations inversely to a normalized combined orthogonal coordinates slope of steepest ascent, said slope being considered with respect to the path designator as mapped onto the dependent coordinate.

SUMMARY OF THE INVENTION

In view of the foregoing, it is an object of the present invention to provide automated forms of data processing and corresponding processes which will include essential weighting of squared deviations.

It is an object of the present invention to establish and provide for implementing essential weighting of squared deviations as represented by normal or alternate path mappings of path coincident deviations or path-oriented data-point projections.

It is an object of the present invention to provide automated forms of data processing and corresponding processes with capability of implementing restraints of alternately considered deviations to enhance evaluation of biased offsets.

It is an object of the present invention to provide automated forms of data processing and corresponding processes which will include weighting by essential weight factors, being the product of tailored weight factors and respective normalization coefficients, and being held constant during optimizing manipulations.

It is an object of the present invention to provide automated forms of data processing which will establish normalization coefficients which include skew ratios being held constant during optimizing manipulations.

It is a further object of the present invention to provide option for rendering component measurement variability as the square of estimated measurement uncertainty plus the added dispersion, caused by error deviations in related antecedent variable measurements.

It is another object of the present invention to provide option for respectively including coordinate-related estimates of dispersion-accommodating measurement variability and respective weighting of mapped dependent sample coordinates in correspondence with each considered sample and each pertinent, or alternately considered, degree of freedom.

It is another object of the present invention to provide option for rendering dispersion in determined measure as a function of the variabilities of orthogonal measurement sampling uncertainty to establish respective representation for essential weighting of squared path-oriented data-point projection mappings.

It is an object of the present invention to provide alternate means for the handling of unquantifiable dependent variable representations.

It is also an object of the present invention to generate reduction products as processing system output to represent or reflect corresponding data inversions and to provide means for producing data representations which establish descriptive correspondence of determined parametric form in order to establish values, implement means of control, or characterize descriptive correspondence by generated parameters and product output in forms including memory, registers, media, machine with memory, printing, and/or graphical representations.

The foregoing objects and other objects, advantages, and features of this invention will be more fully understood by reference to the following detailed description of the invention when considered in conjunction with the accompanying drawings and command code listings.

BRIEF DESCRIPTION OF THE DRAWINGS AND COMMAND CODE LISTINGS

In order that the present invention may be clearly understood, it will now be described, by way of example, with reference by figure number, to the accompanying drawings and command code listings, wherein like numbers indicate the same or similar components as configured for a corresponding application and wherein:

FIG. 1 depicts an example of path-oriented data-point projections and associated dependent coordinate mappings in accordance with the present invention.

Figure 3:
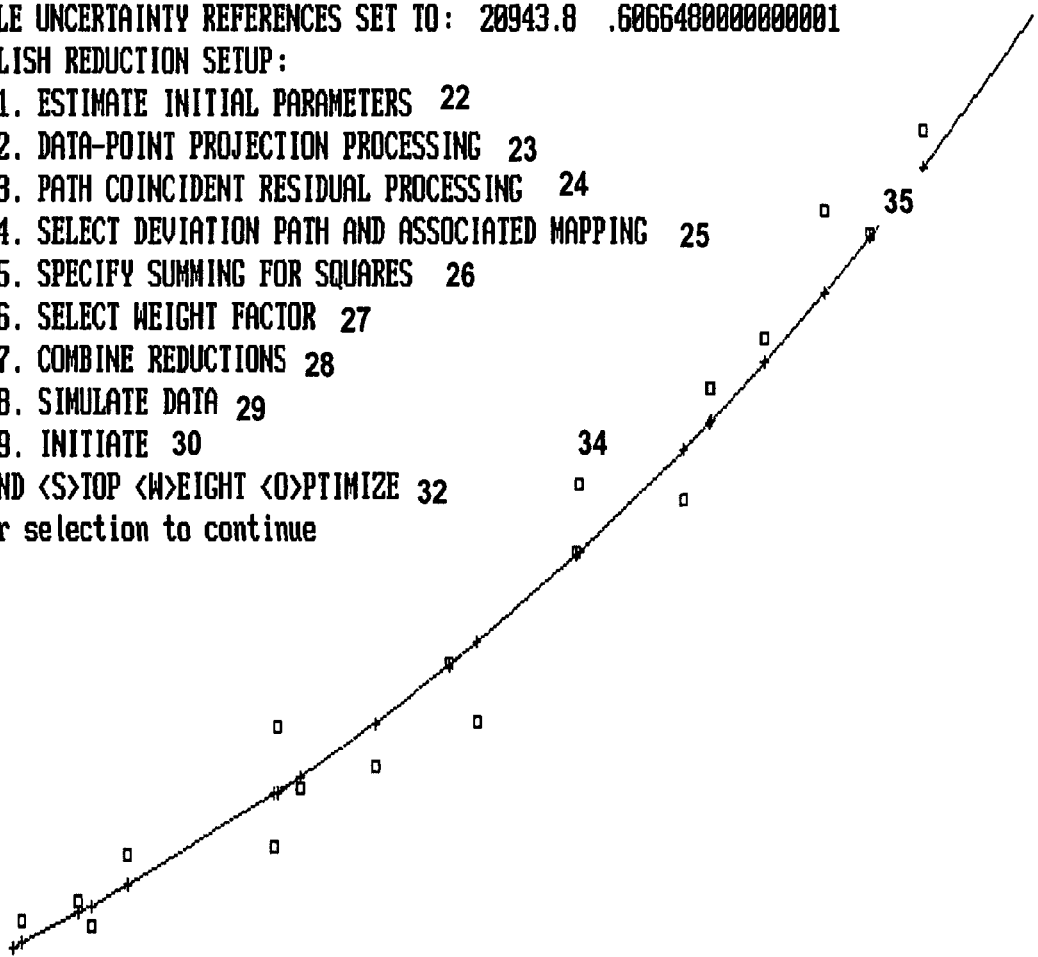

FIG. 3 presents a view of a monitor display depicting provisions to establish reduction setup options in accordance with the present invention.

FIG. 4 illustrates part 1 of a QBASIC path designating subroutine, being implemented for generating dependent coordinate mappings of considered deviation paths in accordance with the present invention.

FIG. 5 illustrates part 2 of a QBASIC path designating subroutine, being implemented for generating path function derivatives with respect to fitting parameters in accordance with the present invention.

FIG. 6 illustrates part 3 of a QBASIC path designating subroutine, being implemented for generating path function derivatives with respect to independent variables in accordance with the present invention.

FIG. 7 illustrates part 4 of a QBASIC path designating subroutine, being implemented for generating weight factors in accordance with the present invention.

FIG. 8 illustrates exemplary QBASIC command code for establishing projection inter-sections in accordance with the present invention.

Figure 9:
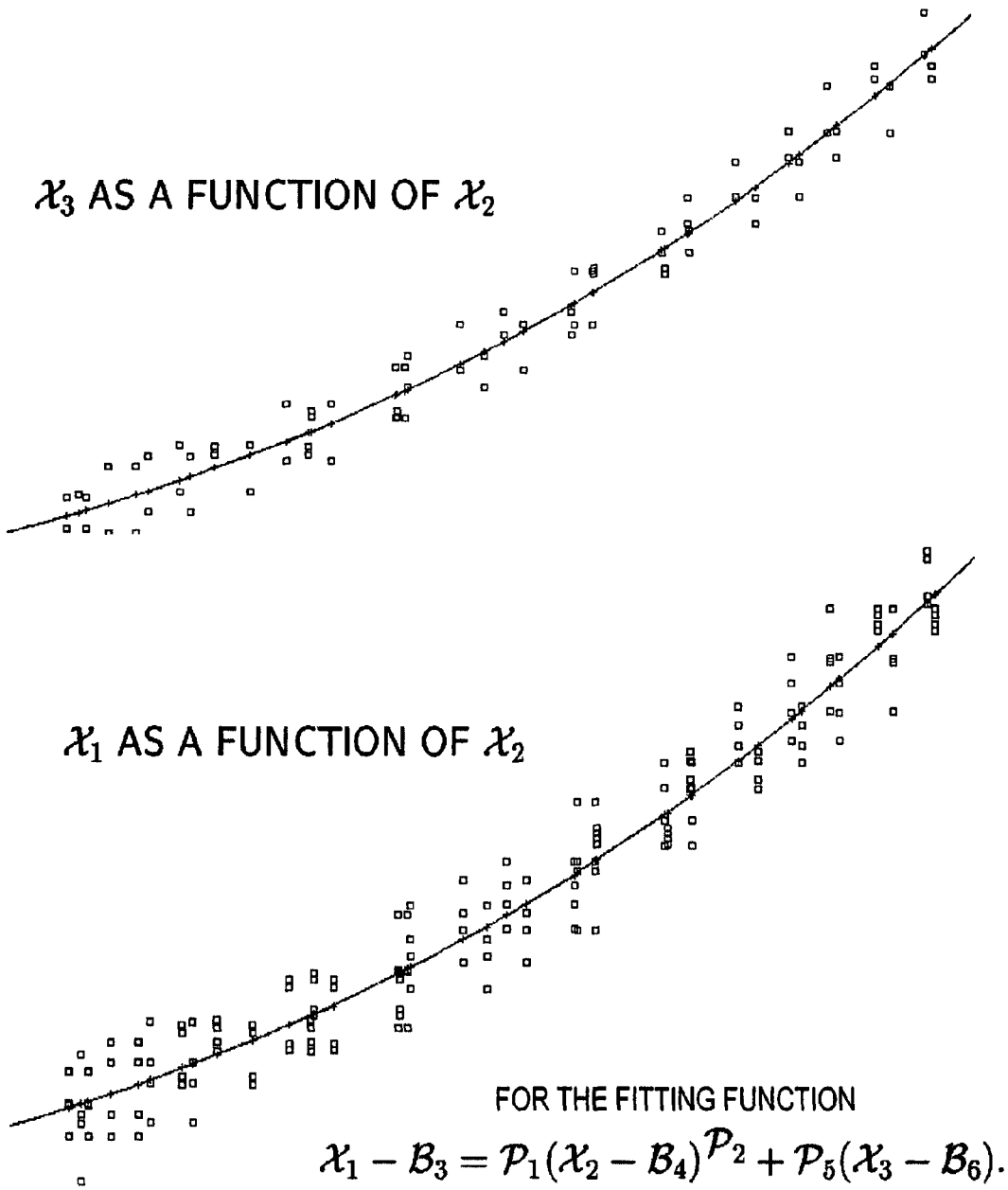

FIG. 9 illustrates a simulation of ideally symmetrical three dimensional data, with reflected random deviations being rendered with respect to a considered fitting function for comparison of inversions being rendered in accordance with the present invention.

A DETAILED DESCRIPTION OF THE INVENTION

Referring now to FIG. 1 in accordance with the present invention, path-oriented data-point projections are rendered to represent a most likely path from a sampled data point to a function location. FIG. 1 illustrates a two dimensional fitting function, 1, along with associated data at point A, 2, with coordinates (X,Y), 3. Point B, 4, represents the intersection of an ideal data-point projection, 5, from the data at point A, as projected normal to the curve. Point C, 6, represents the mapped location of projected components onto a respective dependent variable coordinate. Point D, 7, establishes the relative placement of the path with respect to the fitting function for dependent residuals divided by the square root of effective variance, thereby establishing the squared deviation of the respective path normalized on the effective variance, 8, as a function of the independent variable sample.

The Point E, 10, establishes the relative placement of the mapped path origin with respect to the fitting function for approximated path-oriented data point projections, 11, mapped to the coordinates (X, G), 12, as a function of the intersecting projection slope and independent variable observation samples. And in accordance with the present invention, the distance between the data-point coordinates (X,Y), 3, at A, 2, and the point E, 10, represents a transverse component mapping, 13, which is actually projected from the data sample to point E, 10, along a transverse coordinate, and which may also be represented in consideration of path-oriented deviations. In accordance with the present invention, paths may be alternately represented to characterize particularly unique restraints that might be associated with system observation sample displacements. And, in accordance with the present invention, by implementing essential and/or alternate composite weighting, unique deviation paths may be singularly represented or combined with alternate paths to establish an appropriate maximum likelihood estimator which will characterize considered observation sample data.

Still referring to FIG. 1, in accordance with the present invention, an expression for normal path-oriented data-point projections $\delta N_d$, 11, can be rendered for multivariate path deviations by Equations 46.

$$\delta_{N_d} \sim N_d - N_d = \frac{(X_d - X_d)\sqrt{\sum_{v=1}^{N} \mathcal{V}_v \frac{\partial X_d^2}{\partial X_v}}}{\mathcal{V}_d}. \tag{46}$$

In accordance with the present invention, Equations 46 may be alternately rendered in correspondence with the actual intercept of the normal projection, 5, with the fitting function, 1, by determining the coordinates of said actual interception. For example:

The slope of the normal projection may be represented as minus the inverse of the derivative of $\mathcal{Y}$ with respect to the independent variable, $\mathcal{X}_i$. Rendering the line normal to the fitting function passing through the normalized data point $(X_{ik}, Y_k)$ will yield:

$$y_{\perp} = -\frac{\mathcal{X}_i}{y'(\mathcal{X}_i)} \frac{\mathcal{V}_Y}{\mathcal{V}_{X_i}} + Y_k + \frac{X_{ik}}{y'(\mathcal{X}_{ik})} \frac{\mathcal{V}_{Y_k}}{\mathcal{V}_{X_{ik}}}. \quad (47)$$

Combining the equation for the normal line with the fitting function to establish the respective $\mathcal{X}_{Ik}$ and $\mathcal{Y}_k$ coordinates corresponding to the intersection of the normal line with the fitting function will yield two equations to be solved simultaneously in correspondence with each data point:

$$y_k - Y_k = -\frac{(\mathcal{X}_{ik} - X_{ik})}{y'(\mathcal{X}_{ik})} \frac{\mathcal{V}_{Y_k}}{\mathcal{V}_{X_{ik}}}, \quad (48)$$

and $$\frac{\mathcal{X}_{ik} - X_{ik}}{\mathcal{V}_{X_{ik}}} = -y'(\mathcal{X}_{ik}) \frac{y(\mathcal{X}_{ik}) - Y_k}{\mathcal{V}_{Y_k}}. \quad (49)$$

To establish respective form for essential weight factors in accordance with the present invention, unit-less variable related normal path designators, $\mathcal{N}$, can be rendered as the function portion of the respective projection, as considered in Equation 50:

$$\mathcal{N}_d = \frac{\mathcal{X}_d \sqrt{\sum_{v=1}^{N} \mathcal{V}_v \frac{\partial \mathcal{X}_d^2}{\partial \mathcal{X}_v}}}{\mathcal{V}_d}. \quad (50)$$

A corresponding representation for the respectively mapped observation sample is provide by Equation 51:

$$N_d = \frac{X_d \sqrt{\sum_{v=1}^{N} \mathcal{V}_v \frac{\partial \mathcal{X}_d^2}{\partial \mathcal{X}_v}}}{\mathcal{V}_d}. \quad (51)$$

The dependent component deviation variabilities, type 1 and type 2, $\mathcal{V}_{G_d}$ and $\mathcal{V}_{N_d}$, may be approximated in correspondence with Equations 52 and 53 respectively:

$$\mathcal{V}_{N_{dk}} = \mathcal{V}_{dk}, \quad (52)$$

and $$\mathcal{V}_{G_d} = \left( -\mathcal{V}_d \frac{\partial \mathcal{X}_d^2}{\partial \mathcal{X}_d} + \sum_{\ell=1}^{N} \mathcal{V}_\ell \frac{\partial \mathcal{X}_d^2}{\partial \mathcal{X}_\ell} \right)_{\mathcal{P}_k}. \quad (53)$$

In accordance with the present invention, there are alternate expressions for generating representation for the dispersions or considered variability in representing a determined value for $\mathcal{X}_d$ as a function orthogonal error affected observations (ref. U.S. Pat. No. 7,107,048.)

Assuming the deviations of dependent variable samples, $X_{dk} - \mathcal{X}_{dk}$, as individually considered to be characterized by non-skewed uncertainty distributions, said distributions being proportionately represented by a corresponding datum variability, $\mathcal{V}_{dk}$, a skew ratio for both path coincident deviations and path-oriented data-point projections can be expressed as the ratio of the dependent variable sample deviations to the path coincident deviations:

$$\mathcal{R}_{N_{dk}} = \mathcal{R}_{N_{dk}} \quad (54)$$

$$= \left( \frac{X_d - \mathcal{X}_d}{\delta_{N_d}} \right)_{\mathcal{P}_k}$$

$$= \left[ \frac{\mathcal{V}_d (X_d - \mathcal{X}_d)}{(X_d - \mathcal{X}_d) \sqrt{\sum_{v=1}^{N} \mathcal{V}_v \frac{\partial \mathcal{X}_d^2}{\partial \mathcal{X}_v}}} \right]_{\mathcal{P}_k}$$

$$= \left( \frac{\mathcal{V}_d}{\sqrt{\sum_{v=1}^{N} \mathcal{V}_v \frac{\partial \mathcal{X}_d^2}{\partial \mathcal{X}_v}}} \right)_{\mathcal{P}_k}.$$

In accordance with the present invention the skew ratios and, as necessary, variabilities are evaluated in correspondence with successive estimates for the fitted parameters, $\mathcal{P}$, being held constant during successive optimization steps of the maximum likelihood estimating process.

In accordance with the present invention, by incorporating the dependent component deviation variability type 1 of Equations 52, along with the skew ratio of Equations 54 and tailored weight factors of form given by Equations 18, an expression for the essential weighting of squared normal path coincident deviations can take the form of Equations 55:

$$\mathcal{W}_{N_{dk}} \sim \frac{\mathcal{R}_{N_d}}{\sqrt{\mathcal{V}_{N_d}}} \sqrt{\left[ \frac{-1}{\mathcal{V}_d} \left( \frac{\partial \mathcal{X}_d}{\partial \mathcal{N}_d} \right)^2 + \sum_{j=1}^{N} \frac{1}{\mathcal{V}_j} \left( \frac{\partial \mathcal{X}_j}{\partial \mathcal{N}_d} \right)^2 \right]_{\mathcal{P}}} k = \quad (55)$$

$$\sqrt{\sum_{j=1}^{N} \frac{\dfrac{-\mathcal{R}_{N_d}^2}{\mathcal{V}_d \mathcal{V}_{N_d}}}{\left[\dfrac{-\sqrt{\sum_{v=1}^{N} \mathcal{V}_v \left(\dfrac{\partial X_d}{\partial X_v}\right)^2}}{\mathcal{V}_d}\right]^2_{\mathcal{P}_k} + \dfrac{\dfrac{\mathcal{R}_{N_d}^2}{\mathcal{V}_j \mathcal{V}_{N_d}}}{\left[\dfrac{\left(\dfrac{\partial X_d}{\partial X_j}\right)\sqrt{\sum_{v=1}^{N}\mathcal{V}_v\left(\dfrac{\partial X_d}{\partial X_v}\right)^2}}{\mathcal{V}_d} + \dfrac{X_d \sum_{v=1}^{N}\mathcal{V}_v\left(\dfrac{\partial X_d}{\partial X_v}\dfrac{\partial^2 X_d}{\partial X_j \partial X_v}\right)}{\mathcal{V}_d\sqrt{\sum_{v=1}^{N}\mathcal{V}_v\left(\dfrac{\partial X_d}{\partial X_v}\right)^2}}\right]^2_{\mathcal{P}_k}}} = \dfrac{\left(\dfrac{\mathcal{V}_d}{\sqrt{\sum_{v=1}^{N}\mathcal{V}_v\dfrac{\partial X_d^2}{\partial X_v}}}\right)^2_{\mathcal{P}_k}}{\sum_i \sqrt{\mathcal{V}_{ik}\mathcal{V}_{N_{dk}}}\left[\left(\dfrac{\partial X_d}{\partial X_i}\right)_k + \dfrac{X_{dk}\sum_{v=1}^{N}\mathcal{V}_{vk}\left(\dfrac{\partial X_d}{\partial X_v}\dfrac{\partial^2 X_d}{\partial X_v}\right)_k}{\sum_{v=1}^{N}\mathcal{V}_{vk}\left(\dfrac{\partial X_d}{\partial X_v}\right)^2}\right]_{\mathcal{P}}},$$

wherein the summation over all variables, as signified by the subscript j, has been replaced by a summation over just the independent variables, as signified by the subscript i.

A form for rendering the weighted sum of squared normal path coincident deviations, as rendered to include essential weighting in accordance with the present invention, is provided by Equation 56:

$$\xi_{N_d} \sim \sum_{k=1}^{K} \dfrac{\left(\dfrac{\mathcal{V}_d}{\sqrt{\sum_{v=1}^{N}\mathcal{V}_v \dfrac{\partial X_d^2}{\partial X_v}}}\right)^2_{\mathcal{P}_k} \left(\dfrac{(X_d - \mathcal{X}_d)\sqrt{\sum_{v=1}^{N}\mathcal{V}_v\dfrac{\partial X_d^2}{\partial X_v}}}{\mathcal{V}_d}\right)^2_{\mathcal{P}_k}}{\sum_i \sqrt{\mathcal{V}_{ik}\mathcal{V}_{N_{dk}}}\left[\left(\dfrac{\partial X_d}{\partial X_i}\right)_k + \dfrac{X_{dk}\sum_{v=1}^{N}\mathcal{V}_{vk}\left(\dfrac{\partial X_d}{\partial X_v}\dfrac{\partial^2 X_d}{\partial X_v}\right)_k}{\sum_{v=1}^{N}\mathcal{V}_{vk}\left(\dfrac{\partial X_d}{\partial X_v}\right)^2}\right]_{\mathcal{P}}}.$$ (56)

Referring back to FIG. 1, in accordance with the present invention, essential weight factors $\mathcal{W}_{N_{dk}}$, for weighting the squares of normal path-oriented data-point projection, 5, or approximations of the same, 11, can take the form of Equations 57:

$$\mathcal{W}_{N_{dk}} \sim \dfrac{\left(\dfrac{\mathcal{V}_d}{\sqrt{\sum_{v=1}^{N}\mathcal{V}_v\dfrac{\partial X_d^2}{\partial X_v}}}\right)^2_{\mathcal{P}_k}}{\sum_i \sqrt{\mathcal{V}_{ik}\mathcal{V}_{N_{dk}}}\left[\left(\dfrac{\partial X_d}{\partial X_i}\right)_k + \dfrac{X_{dk}\sum_{v=1}^{N}\mathcal{V}_{vk}\left(\dfrac{\partial X_d}{\partial X_v}\dfrac{\partial^2 X_d}{\partial X_v}\right)_k}{\sum_{v=1}^{N}\mathcal{V}_{vk}\left(\dfrac{\partial X_d}{\partial X_v}\right)^2}\right]_{\mathcal{P}}}.$$ (57)

Note that the sans serif N in Equation 55 is replaced in Equation 57 by a calligraphic $\mathcal{N}$ to indicate inclusion of type 2 deviation variability. A respective sum of weighted squares of normal path-oriented data-point projections is expressed by Equation 58:

$$\xi_{N_d} \sim \sum_{k=1}^{K} \dfrac{\left(\dfrac{\mathcal{V}_d}{\sqrt{\sum_{v=1}^{N}\mathcal{V}_v \dfrac{\partial X_d^2}{\partial X_v}}}\right)^2_{\mathcal{P}_k}\left(\dfrac{(X_d - \mathcal{X}_d)\sqrt{\sum_{v=1}^{N}\mathcal{V}_v\dfrac{\partial X_d^2}{\partial X_v}}}{\mathcal{V}_d}\right)^2_{\mathcal{P}_k}}{\sum_i \sqrt{\mathcal{V}_{ik}\mathcal{V}_{N_{dk}}}\left[\left(\dfrac{\partial X_d}{\partial X_i}\right)_k + \dfrac{X_{dk}\sum_{v=1}^{N}\mathcal{V}_{vk}\left(\dfrac{\partial X_d}{\partial X_v}\dfrac{\partial^2 X_d}{\partial X_v}\right)_k}{\sum_{v=1}^{N}\mathcal{V}_{vk}\left(\dfrac{\partial X_d}{\partial X_v}\right)^2}\right]_{\mathcal{P}}}.$$ (58)

It is advised that second order derivatives, as included in representation of essential weight factors be retained, however in order to simplify form with disregard to associated ramifications, in accordance with the present invention, said essential weight factors may be alternately rendered with their exclusion.

Referring back to FIG. 1, in consideration of the formulation of the sum of squared deviations as normalized on effective variance being related to a respectively normalized deviation, 8, or as alternately rendered by the mapping of normal projections from the data to the fitting function, 5, or approximations thereof, 11, consider the following:

1: Although the effective variance normalization allows for the combining of random deviation components to render an assumed representation of the displacement between the data point and the assumed true value, there is no valid approximation which will establish said true value. Hence, the validity of that approach must be considered with some reservation.

2. Still considering said squared deviations as normalized on effective variance and being implemented to include essential weighting, in accordance with the present invention, assuming that an appropriate hierarchical order can be established and that ordered bivariate regressions can be generated, reasonably accurate inversions may be anticipated; however, for these and for other applications being considered in accordance with the present invention, an alternate approach might be advised.

3. Referring back to Equations 38, it is apparent that the normal to a multivariate function should be separately represented in corresponding with each independent orthogonal axis. Although the resulting error deviation may represent a combination of contributing errors from each independent axis, there can only be one data-point projection which, with respect to all considered dimensions, will be mutually normal to the fitting function. Hence, in accordance with the present invention, the validity of Equations 55 and 57, as summed over multiple degrees of freedom, is also questionable.

Perhaps due to the bivariate restrictions on normal displacements, a more fitting representation for multivariate path deviations might be presented in the somewhat incoherent form of Equation 59, as an RMS sum of contributing components:

$$\delta_{N_d} \sim N_d - N_d = \frac{(X_d - X_d)\sqrt{\left(\sum_{v=1}^{N} \mathcal{V}_v \frac{\partial X_d^2}{\partial X_v}\right) + \mathcal{V}_d(N-1)}}{\mathcal{V}_d}. \quad (59)$$

In accordance with the present invention, for whichever deviation path is selected for data modeling, the respective weight factors as generated should accommodate the square of a skew ratio normalized on reduction type variability, said weight factors, as generated for bivariate applications in accordance with the present invention, being rendered to at least approximately correspond to said skew ratio divided by the square root of said reduction type variability, with deviation in the correspondence between said weight factor and said skew ratio divided by said square root being a function of variations in the associated fitting function slope. In accordance with the present invention, for linear applications, said weight factors may be rendered equal to said skew ratio normalized on said square root of said respective reduction type variability.

In accordance with the present invention, skew ratios are not considered to be variant during calculus related optimizing manipulations, but are rendered by known values or successive approximations. In accordance with the present invention, skew ratios are expressed as the ratios of dependent variable sample deviations to the considered path coincident deviations. In accordance with the present invention, reduction type variability may either represent a type 1 deviation variability, associated with the sampling of the currently considered dependent variable, or the dispersion or a type 2 deviation variability, associated with representing said currently considered dependent variable coordinate as related to respective orthogonal observation samples, as a function of currently assumed estimates or successive approximations for a fitting function.

Referring back to FIG. 1, perhaps a somewhat nonbiased multivariate path representation can be rendered in the form of transverse component deviation mappings, 13. In accordance with the present invention, an expression for multivariate component deviation mappings, $\delta_{T_d}$, can be rendered for transverse deviation paths by merely replacing the representation of effective variance, as included in Equation 50 by a type 2 deviation variability as illustrated in Equation 60:

$$\delta_{T_d} = \mathcal{T}_d - T_d = \frac{(X_d - X_d)\sqrt{\left(\sum_{v=1}^{T} \mathcal{V}_v \frac{\partial X_d^2}{\partial X_v}\right) - \mathcal{V}_d}}{\mathcal{V}_d}. \quad (60)$$

The respective skew ratios are expressed as the ratios of the dependent variable sample deviations to the path coincident deviations, as:

$$\mathcal{R}_{T_{dk}} = \mathcal{R}_{T_{sk}} = \left[\frac{\mathcal{V}_d}{\sqrt{\left(\sum_{v=1}^{T} \mathcal{V}_v \frac{\partial X_d^2}{\partial X_v}\right) - \mathcal{V}_d}}\right]_{\mathcal{P}_k} \quad (61)$$

In consideration of Equations 38, renditions for the normal projection from the data-point to the fitting function, 5, as portrayed in FIG. 1, should be limited to bivariate representations, either in the form of hierarchical regressions or in the form of bicoupled path-oriented component addends which, appropriately normalized and weighted, can be included in a multidimensional sum of squared deviations. Note that the normal projection from data to fitting function, 5, is entirely and accurately represented as a function of two degrees of freedom. If a third or higher degree of freedom were to be included, the same said normal projection would be independently represented in correspondence with each respective independent variable degree of freedom. Hence, by including essential weighting in correspondence with each respective degree of freedom, each corresponding representation for said normal projection can be included in the associated likelihood estimator. Due to the fact that as the number of parameters to be evaluated increases, the likelihood of abstracting a valid solution set decreases, hierarchical regressions should if at all possible be incorporated, but the ability to include multiple variable regressions as necessary may alternately be incorporated by the implementation of appropriately rendered path-oriented deviations along with the associated essential weighting as rendered for bicoupled applications in accordance with the present invention.

Referring again to FIG. 1, In accordance with the present invention a sum of squared deviations for bicoupled path-oriented data-point projections can be rendered in form of Equation 62:

$$\xi_G = \sum_{d=1}^{N} \varepsilon_{G_d}, \tag{62}$$

wherein the calligraphic $\mathcal{G}$ designates the summation in correspondence with a considered set of bivariate deviation paths. Here consider the alternate representations for nomenclature as rendered in the following examples:

1. For the normal approximation to the path-oriented data-point projection length, 11, the sum of weighted squared deviations can be rendered as $$\varepsilon_N \sim \sum_{d=1}^{N} \xi_{N_d} \sim \tag{63}$$

$$\sum_{d=1}^{N}\sum_{k=1}^{K}\sum_{i} \frac{\left(\frac{\mathcal{V}_d}{\sqrt{\mathcal{V}_d + \mathcal{V}_i \frac{\partial \mathcal{X}_d^2}{\partial \mathcal{X}_i}}}\right)^2_{\mathcal{P}_k} \left(\frac{(\mathcal{X}_d - X_d)\sqrt{\mathcal{V}_d + V_i \frac{\partial \mathcal{X}_d^2}{\partial \mathcal{X}_i}}}{\mathcal{V}_d}\right)^2_{\mathcal{P}_k}}{\sqrt{\mathcal{V}_i \mathcal{V}_{N_d}} \left(\frac{\partial \mathcal{X}_d}{\partial \mathcal{X}_i} + \frac{\mathcal{X}_d \mathcal{V}_i \frac{\partial \mathcal{X}_d}{\partial \mathcal{X}_i} \frac{\partial^2 \mathcal{X}_d}{\partial \mathcal{X}_i}}{\mathcal{V}_d}\right)}.$$

(An exact form for the weighted sum of the squares of normal path-oriented projections from data to fitting function, 5, may be rendered in correspondence with Equation 63 by representing the dependent and independent variables, $\mathcal{X}_d$ and $\mathcal{X}_i$, in correspondence with Equations 48 and 49) 2. For the dependent residual normalized on effective variance, 8, being considered as a path orient data-point projection, the sum of weighted squared deviations can be rendered as $$\varepsilon_E \sim \sum_{d=1}^{N} \xi_{E_d} \sim \tag{64}$$

$$\sum_{d=1}^{N}\sum_{k=1}^{K}\sum_{i} \frac{\left(\sqrt{\mathcal{V}_d + \mathcal{V}_i \frac{\partial \mathcal{X}_d^2}{\partial \mathcal{X}_i}}\right)^2_{\mathcal{P}_k} \left(\frac{(\mathcal{X}_d - X_d)}{\sqrt{\mathcal{V}_d + \mathcal{V}_i \frac{\partial \mathcal{X}_d^2}{\partial \mathcal{X}_i}}}\right)^2_{\mathcal{P}_k}}{\sqrt{\mathcal{V}_i \mathcal{V}_{E_d}} \left(\frac{\partial \mathcal{X}_d}{\partial \mathcal{X}_i} + \frac{\mathcal{X}_d \mathcal{V}_i \frac{\partial \mathcal{X}_d}{\partial \mathcal{X}_i} \frac{\partial^2 \mathcal{X}_d}{\partial \mathcal{X}_i}}{\mathcal{V}_d}\right)}.$$

4. For transverse component mapping, 13, of path-oriented data-point projections, the sum of weighted squared deviations can be rendered as $$\varepsilon_T \sim \sum_{d=1}^{N} \xi_{T_d} \sim \tag{65}$$

$$\sum_{d=1}^{N}\sum_{k=1}^{K}\sum_{i} \frac{\left(\frac{\mathcal{V}_d}{\sqrt{\mathcal{V}_i \frac{\partial \mathcal{X}_d^2}{\partial \mathcal{X}_i}}}\right)^2_{\mathcal{P}_k} \left(\frac{(\mathcal{X}_d - X_d)\sqrt{\mathcal{V}_i \frac{\partial \mathcal{X}_d^2}{\partial \mathcal{X}_i}}}{\mathcal{V}_d}\right)^2_{\mathcal{P}_k}}{\sqrt{\mathcal{V}_i \mathcal{V}_{T_d}} \left(\frac{\partial \mathcal{X}_d}{\partial \mathcal{X}_i} + \frac{\mathcal{X}_d \mathcal{V}_i \frac{\partial \mathcal{X}_d}{\partial \mathcal{X}_i} \frac{\partial^2 \mathcal{X}_d}{\partial \mathcal{X}_i}}{\mathcal{V}_i \frac{\partial \mathcal{X}_d^2}{\partial \mathcal{X}_i}}\right)}.$$

In accordance with the present invention, an alternate formulation for essential weighting of path-oriented deviations may be rendered by replacing the included tailored weight factors by a modified form. Said modified form, or modified tailored weight factor, would be alternately defined as the square root of the sum of the squares of the partial derivatives of each of the independent variables, as normalized on square roots of respective local variabilities, or as alternately rendered as locally representative of non-skewed homogeneous error distributions, said partial derivatives being taken with respect to the locally represented path-oriented deviation δ multiplied by a local skew ratio, $\mathcal{R}_G$, and normalized on the square root of the respectively considered deviation variability.

For example and in accordance with the present invention, Equations 63 through 65 may be alternately rendered as by Equations 66 through 68:

For the normal approximation to the path-oriented data-point projection length, 11, the sum of weighted squared deviations can be alternately rendered as $$\varepsilon_N \sim \sum_{d=1}^{N} \xi_{N_d} \sim \tag{66}$$

$$\sum_{d=1}^{N}\sum_{k=1}^{K}\sum_{i} \frac{\left(\frac{\mathcal{V}_d}{\sqrt{\mathcal{V}_d + \mathcal{V}_i \frac{\partial \mathcal{X}_d^2}{\partial \mathcal{X}_i}}}\right)^2_{\mathcal{P}_k} \left(\frac{(\mathcal{X}_d - X_d)\sqrt{\mathcal{V}_d + V_i \frac{\partial \mathcal{X}_d^2}{\partial \mathcal{X}_i}}}{\mathcal{V}_d}\right)^2_{\mathcal{P}_k}}{\sqrt{\mathcal{V}_i \mathcal{V}_{N_d}} \left(\frac{\partial \mathcal{X}_d}{\partial \mathcal{X}_i} + \frac{(\mathcal{X}_d - X_d)\mathcal{V}_i \frac{\partial \mathcal{X}_d}{\partial \mathcal{X}_i} \frac{\partial^2 \mathcal{X}_d}{\partial \mathcal{X}_i^2}}{\mathcal{V}_d + \mathcal{V}_i \frac{\partial \mathcal{X}_d^2}{\partial \mathcal{X}_i}}\right)}.$$

(An exact form for the alternately weighted sum of the squares of normal path-oriented projections from data to fitting function, 5, can often be rendered in correspondence with Equation 66 by representing the dependent and independent variables, $\mathcal{X}_d$ and $\mathcal{X}_i$, in correspondence with Equations 48 and 49.)

For the dependent residual normalized on effective variance, 8, being considered as a path orient data-point projection, the sum of weighted squared deviations can be alternately rendered as $$\mathcal{E}_E \sim \sum_{d=1}^{N} \xi_{E_d} \sim \tag{67}$$

$$\sum_{d=1}^{N} \sum_{k=1}^{K} \sum_{i} \frac{\left(\sqrt{\mathcal{V}_d + \mathcal{V}_i \frac{\partial X_d^2}{\partial X_i}}\right)^2_{\mathcal{P}_k} \left(\frac{(X_d - \mathcal{X}_d)}{\sqrt{\mathcal{V}_d + \mathcal{V}_i \frac{\partial X_d^2}{\partial X_i}}}\right)^2_{\mathcal{P}_k}}{\sqrt{\mathcal{V}_i \mathcal{V}_{E_d}} \left(\frac{\partial X_d}{\partial X_i} + \frac{(X_d - \mathcal{X}_d)\mathcal{V}_i \frac{\partial X_d}{\partial X_i} \frac{\partial^2 X_d}{\partial X_i^2}}{\mathcal{V}_d + \mathcal{V}_i \frac{\partial X_d^2}{\partial X_i}}\right)_{\mathcal{P}_k}}.$$

For transverse component mapping, 13, of path-oriented data-point projections, the sum of weighted squared deviations can be alternately rendered as $$\mathcal{E}_T \sim \sum_{d=1}^{N} \xi_{T_d} \sim \tag{68}$$

$$\sum_{d=1}^{N} \sum_{k=1}^{K} \sum_{i} \frac{\left(\sqrt{\mathcal{V}_d + \mathcal{V}_i \frac{\partial X_d^2}{\partial X_i}}\right)^2_{\mathcal{P}_k} \left(\frac{(X_d - \mathcal{X}_d)^2}{\mathcal{V}_d}\right)_{\mathcal{P}_k}}{\sqrt{\mathcal{V}_i \mathcal{V}_{T_d}} \left(\frac{\partial X_d}{\partial X_i} + \frac{(X_d - \mathcal{X}_d)\mathcal{V}_i \frac{\partial X_d}{\partial X_i} \frac{\partial^2 X_d}{\partial X_i^2}}{\mathcal{V}_i \frac{\partial X_d^2}{\partial X_i}}\right)_{\mathcal{P}_k}}.$$

Without further investigation, it would not be advisable to specify which of the two forms, i.e. the unmodified or the modified forms, of essential weighting might provide the best results. It currently appears that the unmodified form, as incorporated in Equations 63 through Equations 65, might be preferred over the modified form as, incorporated into Equations 66 through 68.

In accordance with the present invention, the examples presented in Equations 63 through 68, as well as other applications of essential weighting as rendered to accommodate path-oriented data-point projections, may be alternately rendered to accommodate path coincident deviations by replacing the type 2 deviation variability with type 1. And, in accordance with the present invention, the considered deviation paths may be alternately rendered as necessary to satisfy specific system restraints. Irregardless of the selected form for the deviation path, the dependent and independent variables, $X_d$ and $X_i$, may be alternately rendered in correspondence with Equations 48 and 49 to establish representation for an appropriate intersection of a normal data-point projection with the currently considered fitting function estimate, thus establish true representation for at least normal data-point projects.

Figure 2:
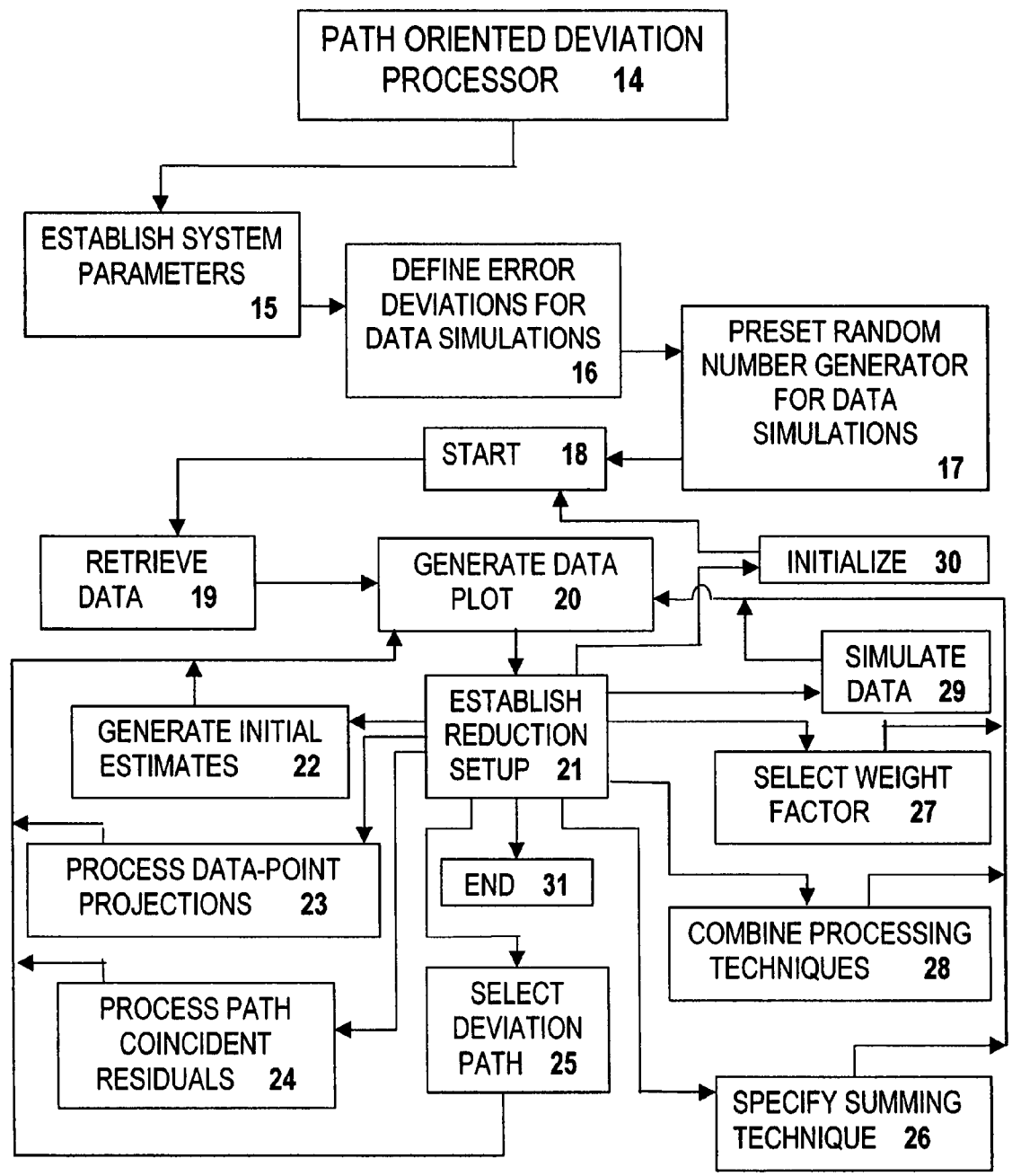
FIG. 2 depicts an exemplary flow diagram which might be considered for the operations of a path-oriented deviation processor in accordance with the present invention.

Referring now to FIG. 2 in consideration of the formulation and implementation of bicoupled path-oriented data-point projections, the sum of squared deviations, 13, as exemplified in FIG. 2 is alternately rendered to represent associated dependent-independent observation sample pairs in accordance with the present invention.

There are a multitude of different algorithms available to provide data inversions for maximum likelihood solutions. Whatsoever inversion techniques might be implemented to provide forms of errors-in-variables processing in accordance with the present invention will require at least some form of essential weighting of squared deviations.

For exemplary purposes of the present disclosure and in accordance with the present invention, at least one form of errors-in-variables data inverting can be implemented to compensate effects of coordinate bias, as inseparably connected to respective coordinate offsets, by adapting a linear processing method previously implemented by the present inventor. (ref. U.S. Pat. Nos. 5,619,432; 5,652,713; 5,884,245; 6,181,976 B1; 7,107,048; and U.S. patent application Ser. No. 11/266,224, now U.S. Pat. No. 7,383,128.) The method includes providing inversions by linearizing with respect to and solving for successive corrections, to establish successive approximations. The processing involves including a first order Taylor series approximation to represent the residuals or data point projections, which are then included in representing the sum of squared deviations. Linear inversions are subsequently rendered to evaluate the corrections which are added to current estimates to establish said successive approximations.

The method may be enhanced by means including increasing the number of fitting parameters as needed to represent all pertinent and/or bias reflective coordinate offsets. The number of addends in the sum of squared deviations may be increased to include alternately considered selections for the dependent variable, thus compensating also for added bias related terms that may be of concern. It may be necessary to provide pre-estimates for and fix any fitting parameters that cannot be independently determined. Also, in accordance with the present invention, it may be advantageous to replace at least one considered offset and related bias with a mean value for the same as rendered in correspondence with the available data and appropriate essential weighting, said mean value being rendered as a function of respective estimates for the remaining fitting parameters.

Consider an ideal fitting function which is descriptive of a system of N variable degrees of freedom with error assumed in the measurement, $X_v$, of each variable, $\mathcal{X}_v$, including the dependent variable, $\mathcal{X}_d$, which is expressed as a function, $\mathcal{F}_d$, of the independent variables, $X_i$, determined fitting parameters, $\mathcal{P}_p$, and coordinate offsets, $\mathcal{B}_v$ and $\mathcal{B}_d$, including respective coordinate sample bias, as shown by Equation 69, $$X_d = \mathcal{F}_d(\mathcal{X}_v - \mathcal{B}_v, \mathcal{P}_p) + \mathcal{B}_d, \tag{69}$$

wherein $\mathcal{X}_d$ will not be included as a function element for other than transcendental functions.

Assuming evaluation of the dependent variable bias and respective coordinate offset is being established by alternate restraints, the mapped observation samples can take the form:

$$\mathcal{G}_d = \mathcal{G}_d(X_d - \mathcal{B}_d, X_v - \mathcal{B}_v, \mathcal{P}_p), \tag{70}$$

wherein the subscript v will include only the system variables which are implemented to define the mapped observation samples as related to the prescribed deviation path. In accordance with the present invention and depending upon the specific application and corresponding reduction processing, any combination of fitting parameters comprising the makeup of the mapped observation samples may be represented by parameter estimates and held constant during minimizing or maximizing operations. In accordance with the preferred embodiment of the present invention, all included parameters may be held constant as prescribed by Equation 71:

$$G_d = G_d(X_d - \mathcal{B}_d, X_v - \mathcal{B}_v, \mathcal{P}_p) \tag{71}$$

A respective path designator for path-oriented deviations would take the form:

$$\mathcal{G}_d = \mathcal{G}_d(X_v - \mathcal{B}_v, \mathcal{P}_p). \tag{72}$$

In accordance with the preferred embodiment of the present invention, at least one mapped dependent component observation coordinate offset and sample bias can be considered as a function of the finalized fitting function and the associated data samples, and hence should, if possible, be replaced by a mean value, to be thus alternately included during optimization manipulations. In accordance with the present invention, fitting parameters can be held constant during optimizing operations when they are alternately represented by estimates or restraints.

Now assume a weighted set of path related deviations consistent with the example of Equations 73 and 74 such that:

$$\delta_d = \sqrt{\mathcal{W}_d}[\mathcal{G}(X_v - \mathcal{B}_v - \Delta B_v, \mathcal{P}_p + \Delta P_p) - G_d(X_v - \mathcal{B}_v, \mathcal{P}_p)], \tag{73}$$

or $$\delta_d = \sqrt{\mathcal{W}_d}[\mathcal{G}(X_v - \mathcal{B}_v - \Delta B_v, \mathcal{P}_p + \Delta P_p) - G_d(X_v - \mathcal{B}_v - \Delta B_v, \mathcal{P}_p + \Delta P_p)], \tag{74}$$

wherein the determined bias and fitting parameters are represented by current estimates, $\mathcal{B}_v$ and $\mathcal{P}_p$, and the undetermined fitting parameters have been replaced by current estimates plus undetermined corrections to estimates, $\mathcal{P}_p + \Delta P_p$ and $\mathcal{B}_v + \Delta B_v$, such that the expected value for the fitting parameters are respectively approximated as the corrections added to corresponding estimates. By rendering first order Taylor series expansion of each residual around the respective estimates, the weighted residuals will take the linear form as approximated by Equations 75, $$\delta_d = \sqrt{W_d}\left[\mathcal{G}_d(X_v - \mathcal{B}_v, \mathcal{P}_p) - G_d(X_d - \mathcal{B}_v, \mathcal{P}_p) - G_d(X_d - \mathcal{B}_d, X_v - \mathcal{B}_v, \mathcal{P}_p)\right] + \sqrt{W_d}\left(\Delta B_d \frac{\partial \mathcal{G}_d}{\partial B_v} - \sum_{v=1}^{P} \Delta P_p \frac{\partial \mathcal{G}_d}{\partial P_p}\right)_{X,\mathcal{B},\mathcal{P}}, \tag{75}$$

or Equations 76, $$\delta_d = \sqrt{W_d}[\mathcal{G}_d(X_v - \mathcal{B}_v, \mathcal{P}_p) - G_d(X_d - \mathcal{B}_d, X_v - \mathcal{B}_v, \mathcal{P}_p)] + \tag{76}$$

$$\sqrt{W_d}\left(\Delta B_d \frac{\partial \mathcal{G}_d}{\partial B_v} - \sum_{v=1}^{N} \Delta B_v \frac{\partial \mathcal{G}_d}{\partial B_v} + \sum_{p=1}^{P} \Delta P_p \frac{\partial \mathcal{G}_d}{\partial P_p}\right)_{X,\mathcal{B},\mathcal{P}} +$$

$$\sqrt{W_d}\left(\Delta B_d \frac{\partial G_d}{\partial B_v} - \sum_{v=1}^{N} \Delta B_v \frac{\partial G_d}{\partial B_v} + \sum_{p=1}^{P} \Delta P_p \frac{\partial G_d}{\partial P_p}\right)_{X,\mathcal{B},\mathcal{P}}.$$

In accordance with the present invention, the mapped observation samples should be considered as constants and hence the form of Equations 73 and 75 would be preferred over the form of Equations 74 and 76. In accordance with the present invention, the corresponding weighted sum of squared deviations can be assumed to take one of several alternate forms, depending upon assumptions related to reduction considerations and explicit nature of the essential weight factors. At least six alternate forms are rendered in general form by Equation 77, $$\xi = \sum \sum_{k=1}^{K} \mathcal{W}\left[\frac{(\mathcal{G}_d - G_d) + \left\{\Delta B_d \frac{\partial \mathcal{G}_d}{\partial B_d}\right\} - }{\sum_{v=1}^{N} \Delta B_v \frac{\partial \mathcal{G}_d}{\partial B_v} + \sum_{p=1}^{P} \Delta P_p \frac{\partial \mathcal{G}_d}{\partial P_p}}\right]^2_{X_k,\mathcal{B},\mathcal{P}}. \tag{77}$$

The leading summation sign in Equation 77 is included to indicate and allow for optional summations, as might be specified over dependent and independent variables. It may either be omitted or replaced with one or two summations to be taken over dependent and/or independent variables. Summations over alternately represented dependent variables will establish restraints for the evaluation of combined bias and coordinate offsets. Summations over independent variables will allow for dependent-independent variable pair representations to allow for the included weight factors to be rendered in a form consistent with multiple bivariate path-oriented deviations, as exemplified in FIG. 2. The essential weight factor, $\mathcal{W}$, may take a form characteristic of either path coincident deviations or path-oriented data-point projections.

Minimizing Equation 77 with respect to the delta parameters $\Delta P_p$ and $\Delta B_v$ will provide correction values for the same, which can be added to the successive estimates to provide new estimates for successive approximations. In the limit as the corrections approach zero, the higher order Taylor series terms will vanish and estimates should approach a statistically accurate inversion.

In accordance with the preferred embodiment of the present invention, the $\mathcal{B}_d$ represents a coordinate offset and respective bias which is already included in the dependent variable sample, and which is most aptly considered as an inherent characteristic of the dependent variable function and, thus, preferably excluded from the minimizing process. The extra term, the $\Delta B_d$, which is enclosed in braces within Equation 77 serves to render the exclusion, and may be included, or it may be omitted when such an exclusion is not desired or not feasible. It can be omitted when the respective correction for offset and bias are pertinent or if they are to be replaced either by a mean value or an appropriate estimate. In accordance with the present invention, a mean value may be rendered by including the weighted mean offset and bias, $\overline{B_d}$, as generated in terms of parametric representation for fitting parameters by Equation 78:

$$\overline{B_d} \approx \frac{\sum_{k=1}^{K} \mathcal{W}_{X_{dk}}(X_{dk} - \mathcal{X}_{dk} + \mathcal{B}_d)_{\mathcal{P}_k}}{\sum_{k=1}^{K} \mathcal{W}_{X_{dk}}}, \tag{78}$$

wherein the included weight factor, $\mathcal{W}_{X_{dk}}$, is represented by an essential weight factor with a skew ratio equal to the square root of $\mathcal{VX}_d$:

$$W_{N_{dk}} \sim \sqrt{\left[\frac{-1}{V_d} + \sum_{j=1}^{N} \frac{1}{V_j}\left(\frac{\partial X_j}{\partial X_d}\right)^2\right]_{\mathcal{P}_k}}. \quad (79)$$

Note that representation for the individual contributions to bias and offset are to be included in the optimization processing as functions of the remaining and included fitting parameters. Note also that such optimization is doable for at least one offset value. Placing such restraints on one offset value should be sufficient to allow for bias evaluation on the remaining combined coordinate offset and bias values, provided that said remaining offset and bias values are not directly coupled one to another.

In accordance with the present invention, for at least one considered representation for a dependent variable, e.g. $\mathcal{X}_{dk}$, Equation 77 may be alternately rendered in the form of Equation 80 to replace the respective bias and offset by a mean value:

$$\xi = \sum \sum_{k=1}^{K} \mathcal{W}\left[\mathcal{G}_d(\mathcal{X}_{dk} + \mathcal{B}_d - \overline{B_d}, \cdots) - \right.$$

$$G_d + \left\{\Delta B_d \frac{\partial \mathcal{G}_d}{\partial B_d} - \Delta B_d \frac{\partial \mathcal{G}_d}{\partial \overline{B_d}} \frac{\partial \overline{B_d}}{\partial B_d}\right\}\right] + \quad (80)$$

$$\sum \sum_{k=1}^{K} \mathcal{W}\left[\left\{\sum_{v=1}^{N} \Delta B_v \frac{\partial \mathcal{G}_d}{\partial \overline{B_d}} \frac{\partial \overline{B_d}}{\partial B_v} - \Delta B_v \frac{\partial \mathcal{G}_d}{\partial B_v}\right\}^2 + \left\{\sum_{p=1}^{P} \Delta P_p \frac{\partial \mathcal{G}_d}{\partial P_p} - \Delta P_p \frac{\partial \mathcal{G}_d}{\partial \overline{B_d}} \frac{\partial \overline{B_d}}{\partial P_p}\right\}\right]_{X_k,\mathcal{B},\mathcal{P}},$$

and wherein the partial derivatives of $\mathcal{B}_d^-$, taken with respect to the fitting parameters $\mathcal{B}$ and P, may be rendered respectively as:

$$\frac{\partial \overline{B_d}}{\partial B_v} = \frac{-\sum_{k=1}^{K} \mathcal{W}_{X_{dk}} \frac{\partial \mathcal{X}_{dk}}{\partial B_v}}{\sum_{k=1}^{K} \mathcal{W}_{X_{dk}}}, \quad (81)$$

and $$\frac{\partial \overline{B_d}}{\partial P_v} = \frac{-\sum_{k=1}^{K} \mathcal{W}_{X_{dk}} \frac{\partial \mathcal{X}_{dk}}{\partial P_v}}{\sum_{k=1}^{K} \mathcal{W}_{X_{dk}}}. \quad (82)$$

In accordance with the present invention, substituting a mean value for a coordinate offset and bias will also necessitate a modification to the weight factors to include the partial derivatives of the representation for the mean value with respect to the considered independent variables. Assuming a mean value as given by Equation 78, those derivatives may be expressed by Equation 83:

$$\frac{\partial \overline{B_d}}{\partial X_v} = \frac{-\sum_{k=1}^{K} \mathcal{W}_{X_{dk}} \frac{\partial \mathcal{X}_{dk}}{\partial X_v}}{\sum_{k=1}^{K} \mathcal{W}_{X_{dk}}}. \quad (83)$$

Presentation of the reduction algorithm can be simplified by the following substitutions:

$$\alpha_p = \left[\sqrt{\mathcal{W}} \frac{\partial \mathcal{G}_d}{\partial P_p}\right]_{X_k,\mathcal{B},\mathcal{P}}, \quad (84)$$

$$\beta_v = \left[\sqrt{\mathcal{W}} \frac{\partial \mathcal{G}_d}{\partial B_v}\right]_{X_k,\mathcal{B},\mathcal{P}}, \quad (85)$$

and $$\gamma = \sqrt{\mathcal{W}} (\mathcal{G}_d - G_d)_{X_k,\mathcal{B},\mathcal{P}}, \quad (86)$$

wherein the missing d, i, and k subscripts on $\alpha_p$, $\beta_v$, $\gamma$, and £ are either optional or understood. An optional d subscript would designate system variables being rendered as the dependent variable. Replacing a sans serif d subscript by a bold d subscript would indicate an optional replacement of the respective coordinate offset and bias by a mean value. An optional i subscript, if included, would designate dependent-independent variable pair weight factors, and the understood missing k subscript designates the respective observation sample. In accordance with the present invention, the weight factors, $\mathcal{W}$, as included in Equations 84 through 86, may be replaced with any essential weight factor which corresponds to both the data and the fitting function. An additional subscript, such as $\mathcal{G}$ or G, might be also included on the essential weight factor, $\mathcal{W}$, to designate path coincident deviations or path-oriented data-point projections; or subscripts $\mathcal{G}$ and G may be replaced with any alternate designators, such as E and E, $\mathcal{N}$ and N, or other symbolic representation to specify any alternately considered path. For options which include replacement of offsets and related bias by mean values, the coordinate oriented weight factors $\mathcal{W}\mathcal{X}$ and corresponding mean values, $\mathcal{B}_d^-$, need to be computed in advance, utilizing successive estimates for the non replaced fitting parameters. The correspondingly represented sum of weighted squared deviations will take the parametric form of Equation 87, $$\xi_{\mathcal{G}_d} = \sum \sum_{k=1}^{K} \left(\gamma + \beta_d \Delta B_d - \sum_{v=1}^{N} \beta_v \Delta B_v + \sum_{p=1}^{P} \alpha_p \Delta P_p\right)^2. \quad (87)$$

Minimizing the sum with respect to the parametric representation for corrections to the fitting parameters will yield the equations:

$$\frac{\partial \xi_{\partial \mathcal{G}_d}}{\partial \Delta P} = \sum \sum_{k=1}^{K} 2$$

$$\alpha\left(\gamma + \beta_d \Delta B_d - \sum_{v=1}^{N} \beta_v \Delta B_v + \sum_{p=1}^{P} \alpha_p \Delta P_p\right) \sim \left(\frac{\partial \xi_{\partial \mathcal{G}_d}}{\partial \Delta P}\right)_{\Delta \mathcal{P}}, \quad (88)$$

and

-continued $$\frac{\partial \xi_{\partial G_d}}{\partial \Delta B} = \sum \sum_{k=1}^{K} 2 \quad (89)$$

$$\beta \left( \gamma + \beta_d \Delta B_d - \sum_{v=1}^{N} \beta_v \Delta B_v + \sum_{p=1}^{P} \alpha_p \Delta P_p \right) \sim \left( \frac{\partial \xi_{\partial G_d}}{\partial \Delta B} \right)_{\Delta B}.$$

Which lead to $$\sum \sum_{k=1}^{K} \alpha \gamma + \Delta B \sum \sum_{k=1}^{K} \alpha \beta_d \Delta B_d - \quad (90)$$

$$\Delta B \sum \sum_{k=1}^{K} \sum_{v=1}^{N} \alpha \beta_v \Delta B_v + \Delta P \sum \sum_{k=1}^{K} \sum_{p=1}^{P} \alpha \alpha_p \Delta P_p = 0,$$

and $$\sum \sum_{k=1}^{K} \beta \gamma + \Delta B \sum \sum_{k=1}^{K} \beta \beta_d \Delta B_d - \quad (91)$$

$$\Delta B \sum \sum_{k=1}^{K} \sum_{v=1}^{N} \beta \beta_v \Delta B_v + \Delta P \sum \sum_{k=1}^{K} \sum_{p=1}^{P} \beta \alpha_p \Delta P_p = 0,$$

which can be expressed in matrix form as $$\sum \begin{bmatrix} \sum_{k=1}^{K} \alpha_1^2 & \cdots & \sum_{k=1}^{K} \alpha_1 \alpha_p & \sum_{k=1}^{K} \alpha_1 \beta_1 & \cdots & \sum_{k=1}^{K} \alpha_1 \beta_N \\ \cdots & \cdots & \cdots & \cdots & \cdots & \cdots \\ \sum_{k=1}^{K} \alpha_P \alpha_1 & \cdots & \sum_{k=1}^{K} \alpha_P^2 & \sum_{k=1}^{K} \alpha_P \beta_1 & \cdots & \sum_{k=1}^{K} \alpha_P \beta_N \\ \sum_{k=1}^{K} \beta_1 \alpha_1 & \cdots & \sum_{k=1}^{K} \beta_1 \alpha_P & \sum_{k=1}^{K} \beta_1^2 & \cdots & \sum_{k=1}^{K} \beta_1 \beta_N \\ \cdots & \cdots & \cdots & \cdots & \cdots & \cdots \\ \sum_{k=1}^{K} \beta_N \alpha_1 & \cdots & \sum_{k=1}^{K} \beta_N \alpha_P & \sum_{k=1}^{K} \beta_N \beta_1 & \cdots & \sum_{k=1}^{K} \beta_N^2 \end{bmatrix} \begin{Bmatrix} \Delta P_1 \\ \cdots \\ \Delta P_P \\ \Delta B_1 \\ \cdots \\ \Delta B_N \end{Bmatrix} = \sum_{d=1}^{N} \begin{Bmatrix} \sum_{k=1}^{K} \alpha_1 \gamma \\ \cdots \\ \sum_{k=1}^{K} \alpha_P \gamma \\ \sum_{k=1}^{K} \beta_1 \gamma \\ \cdots \\ \sum_{k=1}^{K} \beta_N \gamma \end{Bmatrix}. \quad (92)$$

(In accordance with the present invention, the words minimize, minimized, or minimizing, when used with reference to minimizing a sum with respect to fitting parameters to render a data inversion, refer likewise to maximizing the negative of said sum with respect to said fitting parameters to render a same or similar data inversion.) The order of the matrix equation will depend upon the number of fitting parameters that are to be evaluated. In accordance with the present invention, offsets and related bias that can be assumed negligible may either be included or omitted to establish respective inversions. Also, in accordance with the present invention, at least one of the included offsets and related bias terms as it occurs in Equation 92, or possibly one for each coupled pair may be alternately replaced by a mean value which can be represented as a function of the remaining fitting parameters, thus eliminating said at least one coordinate offset and associated bias from the rendition of maximum likelihood and, thereby, reducing the number of fitting parameters to be evaluated and reducing complexity of the matrix equation by an order of one.

Referring now to FIG. 2 with reference to Appendix A: FIG. 2 represents a flow diagram descriptive of the QBASIC command code file, Errinvar.bas, found in Appendix A (or in the compact disk Appendix file entitled Appendix A.) Said command code provides conceptual programming for the practice of options and fundamentals of data processing in accordance with the present invention. Said options and fundamentals include:

1. the rendering of exemplary deviation paths being mapped on to dependent variable coordinates in accordance with the present invention,
2. the rendering of respectively considered skew ratios in accordance with the present invention, said skew ratios comprising ratios of dependent component deviations divided by estimated representation for respective said deviation paths, said dependent component deviations being considered as characterized by non-skewed uncertainty distributions,
3. the formulating and rendering of respectively defined essential weight factors in correspondence with deviation paths and respective skew ratios in accordance with the present invention,
4. the formulating and rendering of exemplary composite weight factors, being rendered to include representation of tailored weighting in accordance with the present invention,
5. the formulating and rendering of alternate weight factors, being rendered in accordance with the present invention, rendering of said alternate weight factors comprising implementation of said skew ratios,
6. the rendering of projection mapping data sets in correspondence with points of intersection of normal path-oriented data-point projections with the respective fitting function, and
7. the rendering of combined processing techniques in accordance with the present invention. In accordance with the present invention, FIG. 2 illustrates an exemplary flow diagram which might be considered for the operations of a path-oriented deviation processor, 14, with processing steps and option selections considered in the following order:

1. Establish system parameters, 15.
2. Define error deviations for data simulations, 16.
3. Preset random number generator for data simulations, 17.
4. Start, 18.
5. Retrieve data, 19.
6. Generate data plot, 20.
7. Establish reduction setup, 21.
8. Generate initial estimates, 22.
9. Process data-point projections, 23.
10. Process path coincident residuals, 24.
11. Select deviation path, 25.
12. Specify summing techniques, 26.
13. Select weight factor, 27.
14. Combine processing techniques, 28.
15. Simulate data, 29.
16. Initialize, 30.
17. End, 31.

Other options being considered in accordance with the present invention, in addition to those mentioned as related to the flow diagram of FIG. 2 and the associated QBASIC command code file, Errinvar.bas, of Appendix A, include:

1. replacing of coordinate offsets and bias by estimated mean values, which are rendered as a function of the considered data and the remaining fitting parameters in accordance with the present invention, 2. rendering of output products comprising memory for storing data for access by application programs being executed on a processing system, said data representation being stored in said memory, and 3. rendering alternate forms of output products which include representations of data inversions and evaluated fitting parameters and/or which provide means for producing data representations which establish descriptive correspondence of determined parametric form in order to establish values, implement means of control, or characterize descriptive correspondence by generated parameters and product output in forms including memory, registers, media, machine with memory, printing, and/or graphical representations.

(Although the replacing of coordinate offsets and bias by mean values is not included in the QBASIC command code of the attached Appendices, method and specification for said replacement is clearly set forth in Equations 81 through 92, and from the brief discussion on the subject contained herein, implementation will be apparent to those skilled in the art. Also, the implementation of state of the art means for rendering output products as here described will likewise be apparent to those skilled in the art.) In accordance with the present invention, operations of accessing, processing, and representing information may be provided by a processing system comprising a control system being configured to activate and effectuate said operations, and to formulate, generate, and render associated data representations.

Referring now to FIG. 3 in conjunction with FIG. 2 and in consideration of a component being implemented to establish reduction setup, 21, FIG. 3 depicts a monitor display with provision to establish reduction setup by depressing numeric characters to access options including: option to generate initial estimates, 22; option to process data-point projections, 23; option to process path coincident residuals, 24; option to select a deviation path, 25; option to specify summing techniques, 26; option to select weight factor, 27; option to combine processing techniques, 28; option to simulate data, 29; and option to initialize, 30.

The reduction setup is alternately affected by depressing alpha characters to access options as follows: Said option to select a weight factor, 27, may be alternately selected by depressing a W. An option to optimize, 32, can be initiated buy depressing an O. The option to end or stop, 31, is accessed by depressing an E or S.

In addition to these option selections, FIG. 3 presents a brief summary, 33, of the form of data that is being prepared for reduction, along with a plot of the data, 34, and, if the data is simulated, FIG. 3 also includes a plot, 35, of the function from which it was simulated. Unless initial estimates are provided as input or stored in a computer file, the procedure with which to estimate initial parameters, 22, may need to be provided by the user in the form of an appropriate command code. Specification of deviation path, 25, summing techniques, 26, and weight factors for either single or combined reductions, 28, need to be set up prior the selection of either data-point projection processing, 23, or path coincident residual processing, 24. The option to optimize, 32, provides for evaluating or approximating the actual location for the intersection of the normal data-point projection with the current or successively approximated estimate for the fitting function.

Referring further to the QBASIC command code of Appendix A in consideration of the selection of a deviation path and associated mapping, 25, the provided path selection rendered by the said command code includes:

1. a transverse path considering a determined designator,
2. a transverse path considering a path variation,
3. a normal path considering a determined designator,
4. a normal path considering a path variation,
5. an effective variance normalization (determined designator),
6. an effective variance normalization (path variation), and
7. a coordinate oriented path.

Referring now to FIG. 4, with further reference to the QBASIC command code of Appendix A, FIG. 4 illustrates part 1 of a QBASIC path designating subroutine comprising: a shared storage designator, 36; a type 2 deviation variability generator, 37; a variability type selector, 38; an effective variance generator, 39; a mapped deviation path and skew ratio generator, 40; and code for rendering path and skew representation for a transverse path, 41; for a normal path, 42; for an effective variance normalization, 43; and for a coordinate oriented path, 44. Input to the subroutine designates the currently selected dependent and independent variables, DV % and IV %, as considered between designated variables V1% and V2%. VSTEP % is either set to one, or it specifies the number of variables of listed order between ordered pairs of dependent and independent variables. For hierarchical regressions, pairs are ordered in correspondence with the order in which the data is presumed to have been taken. For simultaneous errors-in-variables regressions with bicoupled variable representation in accordance with the present invention, VSTEP % will be set to one, and pairs of dependent and independent variables will be considered in the paired order by multiple passes through dependent and independent variable representations. V2% is set to accommodate the total number of variables to be simultaneously considered, and variables are paired without consideration of order. RP % designates the current reduction path setup. K % designates the specific sample observation; and root# is the function evaluated for the current root and dependent variable. Output parameters are DELG#, the designated path length, and the weight factor, WT#.

Shared input parameters respectively include the number of fitting parameters, NFP %; the number of degrees of freedom, NDF %; the reduction summing selection, SUMO %; the path option selection, PTH % ( ) the weight factor selection, WTOP % ( ); the reduction type selection, RTYP$( ) the available data samples, RD#( ) an effective observation sample variability, EV#( ) the first derivatives of the dependent variable taken with respect to the fitting parameters, DDP#( ) the first derivative of the dependent variable taken with respect to the independent variables, DDX#( ); the second derivative of the dependent variable taken first with respect to the independent variables and second with respect to the fitting parameters, DDXP#( ); and the second derivative of the dependent variable with respect to all combinations of pairs of variables, DDXX#( ). The first derivative of the path designator taken with respect to the fitting parameters, DGDP#( ), is provided as a shared output parameter. RTS The type 2 deviation variability generator, 37, provides the type 2 deviation variability for the evaluation of essential weighting for the square of path-oriented data-point projections.

The variability type selector, 38, sets the path-oriented deviation variability for the selected data processing: type 1 for path coincident deviations, and type 2 for path-oriented data-point projections.

The effective variance generator, 39, combines the type 1 deviation variability with the type 2 deviation variability to render the effective variance.

Note that the form of the type 2 deviation variability and the effective variance, whether rendered in bivariate or multivariate form, depends upon the number of variables being considered from V1% to V2% with a step of VSTEP %.

Referring back to FIG. 3 in consideration of the leading summation sign of Equation 77, and in Equations 87 through 92. In accordance with the present invention, said leading summation sign is included to indicate and allow for optional summing for the squares of considered deviations, 26. Referring again to the QBASIC command code of Appendix A, options that provide for the selection of summing include:
1. summing over dependent and independent variables,
2. summing only over dependent variables,
3. summing only over independent variables.
4. not summing over dependent or independent variables,
5. simple sequential summing over ordered pairs, and
6. sequential summing over ordered dependent and independent variables.

In accordance with the present invention, sum over options are provided to accommodate alternate reduction techniques being rendered in accordance with the present invention, including the following:
1. The option of summing over dependent and independent variables provides for rendering residual and path-oriented displacements and respective weight factors as a function of all combinations of bicoupled variables. (Assuming the normal deviation between the function and the data point to be the same for all orthogonal variable pairs, by implementing essential weighting, sums of all squared normal deviations can be combined, irrespective of which variable is being rendered as the dependent variable).
2. The option of summing only over dependent variables allows for the representation of alternate variables as dependent variables, and provides for a multivariate representation of weight factors and residuals.
3. The option of summing only over independent variables provides for rendering path-oriented displacements and respective weight factors as a function of variable pairs in correspondence with a single variable being considered as the dependent variable.
4. The option of not summing over dependent or independent variables provides for a multivariate representation of weight factors and residuals in correspondence with a single dependent variable.
5. The option of simple sequential summing over ordered pairs provides the option of rendering bivariate residual and path-oriented displacements and respective weight factors as a function of sequential pairs, arranged in appropriate order to provide for a series of hierarchical regressions; and
6. sequential, summing over ordered dependent and independent variables provides the option of rendering bivariate residual and path-oriented displacements and respective weight factors as a function of sequential pairs arranged in appropriate order to provide for a series of hierarchical regressions, with both elements of each set of sequential pairs being alternately rendered as the dependent variable.

Referring again to FIG. 4 and considering the QBASIC command code of Appendix A, it is the parameter SUMO % that specifies the selected type of summing for the respective data inversion, and in accordance with the current example of the present invention, it is the designated output storage parameters, DELG#, WT#, and DGDP#( ), with values generated by the QBASIC PATH subroutine, that respectively quantify the path-oriented deviations and provide the weight factors and derivatives needed for said inversion.

Referring now to FIG. 5 in conjunction with Equations 84 through 86 and the matrix Equation 92, in accordance with the present invention, the inversion technique employed by the QBASIC command code of Appendix A, as well as alternate inversion techniques that might be employed, will most likely require representation of the first derivatives of either the path designator or the mapped path-oriented deviation (or designated path) in order to manipulate the inversion. FIG. 5 illustrates part 2 of the QBASIC path designating subroutine as a continuation of FIG. 4. Said part 2 comprises means for rendering said first derivatives.

With regard to said derivatives, most of the equations of this disclosure that describe the essential weight factor and respective sum of squared deviations contain a ratio which includes second order derivatives. This ratio can be expressed as a numerator divided by a denominator and correspondingly reduced to a form which is compatible with a bivariate weight factor consideration, as in Equation 93:

$$\frac{\text{numerator}}{\text{denominator}} = \frac{\sum_{v=1}^{N} \mathcal{V}_{vk}\left(\frac{\partial X_d}{\partial X_v}\frac{\partial^2 X_d}{\partial X_i \partial X_v}\right)_k}{\sum_{v=1}^{N} \mathcal{V}_{vk}\left(\frac{\partial X_d}{\partial X_v}\right)_k^2} \rightsquigarrow \frac{\mathcal{V}_{ik}\left(\frac{\partial X_d}{\partial X_i}\frac{\partial^2 X_d}{\partial X_i^2}\right)_k}{\mathcal{V}_{dk} + \mathcal{V}_{ik}\left(\frac{\partial X_d}{\partial X_i}\right)_k^2}. \quad (93)$$

In accordance with the present invention, a ratio similar to that of Equation 93 may be rendered in correspondence with the derivatives of either the designated path or path designator, taken with respect to associated fitting parameters. Said similar ratio may be expressed in the form of Equation 94:

$$\frac{\text{numerator}}{\text{denominator}} = \frac{\sum_{v=1}^{N} \mathcal{V}_{vk}\left(\frac{\partial X_d}{\partial X_v}\frac{\partial^2 X_d}{\partial P \partial X_v}\right)_k}{\sum_{v=1}^{N} \mathcal{V}_{vk}\left(\frac{\partial X_d}{\partial X_v}\right)_k^2} \rightsquigarrow \frac{\mathcal{V}_{ik}\left(\frac{\partial X_d}{\partial X_i}\frac{\partial^2 X_d}{\partial P \partial X_i}\right)_k}{\mathcal{V}_{dk} + \mathcal{V}_{ik}\left(\frac{\partial X_d}{\partial X_i}\right)_k^2}. \quad (94)$$

FIG. 5 illustrates part 2 of a QBASIC path designating subroutine, comprising a path function derivative generator, 45; a variable selection sorter, 46; a specification adapter, 47, a numerator and denominator generator, 48; and a derivative compiler, 49. The path function derivative generator as rendered for this example is set up to provide a variety of alternate derivative selections including both derivatives with respect to fitting parameters as required for inversion operations and derivatives with respect to independent variables for the rendering of weight factors. The explicit form of the derivatives will depend upon the design of the selected path, which is designated for alternately considered reduction passes by the path option selection input parameter, PTH % ( ). A variable selection sorter, 46, is provided to establish which components are to be included in rendering said numerator and denominator in accordance with the selected form for the summing of squared deviation which is designated by the sum over option input parameter, SUMO %. For sum over options 2 and 4, derivatives with respect to all variables will be included in the rendition. For other sum over options, only derivatives taken with respect to the considered dependent and independent variables are included. The specification adapter, 47, adapts the respective numerator and denominator to coincide with the path specifications, and the derivatives are rendered by the derivative compiler, 49, in correspondence with the selected path option. It should be noted that by setting the reduction type selector, RTS In accordance with the present invention, alternate inversion techniques may be implemented. Normally the value for the reduction type selector is set to one or two in correspondence with the selected path. Reflecting the selection of a corresponding reduction as assumed to be provided by either Equation 75 or 76. An alternate selection may be made by an interactive selection during processing. The preferred form as considered in accordance with the present invention is to assume that the mapped observation sample should be treated as a constant, and that the more appropriated renditions correspond to RTS Referring now to FIG. 6, illustrating part 3 of a QBASIC path designating subroutine, comprising a continued representation of the path function derivative generator, 45; said path function derivative generator is implemented for generating path function derivatives with respect to independent variables in accordance with the present invention, comprising a weight factor initializer and default generator, 50, a dependent variable selection sorter, 51; a summation initializer, 52, an independent variable selection sorter, 53, a numerator and denominator generator, 54; and a derivative compiler, 55.

The portion of the path function derivative generator included in FIG. 6, being rendered for this example, is set up to provide derivatives with respect to independent variables for the rendering of weight factors associated with various deviation paths. The explicit form of the derivatives will depend upon the design of the selected path, which is designated for alternately considered reduction passes by the path option selection input parameter, PTH % ( ). Two variable selection sorters, 51 and 53, for sorting through dependent and independent variables, are separated by a summation initialize, 52, initializing the summations for the numerator/denominator generator, 54. Derivatives taken with respect to the independent variables are formulated by the derivative compiler, 55, in correspondence with the selected paths. Note that derivatives with respect to independent variables, as rendered in the command code of FIG. 6, do not include derivatives of mean values for offset and related bias as provided by Equation 83. In accordance with the present invention, these additional derivatives may be provided by user supplied routines once a fitting function is decided upon. Formulation for rendition of these additional derivatives will be apparent to those skilled in the art. Note also that the comment included in the beginning code of the derivative compiler 55 states: "Here set numsum#=0 for a first derivative weight factor". Under the condition that the second derivatives within Equation 93 are not significant, or possibly to just simplify the reduction process, the ratio provided Equation 93 may be excluded in the rendering of weight factors.

Referring again to the QBASIC command code of Appendix A, in accordance with the present invention, options therein provided for the selection of weight factors include:
1. essential weighting,
2. cursory weighting,
3. skew ratio weighting,
4. squared skew ratio weighting, and
5. no weighting.

Referring now to FIG. 7 with further reference to the QBASIC command code of Appendix A, FIG. 7 illustrates part 4 of a QBASIC path designating subroutine, comprising a weight factor generator, 56, said weight factor generator comprising:
a tailored weight factor generator (part 1), 57;
a spurious weight factor generator (part 1), 58;
a tailored weight factor (part 2) and essential weight factor generator, 59;
a spurious weight factor (part 2) and cursory weight factor generator, 60; and
a normalization weight factor and a skew ratio weight factor generator, 61.

In accordance with the present invention, the tailored weight factor generator (part 1), 57, as rendered in FIG. 7, comprises means for initiating the rendering representation for any of four alternate forms for tailored weighting, depending upon the selection of a deviation path as designated by the reduction selection, RTYP$( ) and the path option parameter, PTH % ( ) said four alternate forms for tailored weighting being characterized by Equations 95 through 98 for the following four configurations:

For path coincident deviations being rendered with respect to a path designator, $$W_{G_k} = \sqrt{\sum_i \left(\frac{\partial X_i / \sqrt{V_i}}{\partial R_G G / \sqrt{V_G}}\right)^2_{P_k}} \sim \sqrt{\frac{V_{G_k}}{R_{G_k}^2} \sum_i \frac{1}{V_{ik}} \left(\frac{\partial X_i}{\partial G}\right)^2_{P_k}}. \quad (95)$$

For path-oriented data-point projections being rendered with respect to a path designator, $$W_{G_k} = \sqrt{\sum_i \left(\frac{\partial X_i / \sqrt{V_i}}{\partial R_G G / \sqrt{V_G}}\right)^2_{P_k}} \quad (96)$$

$$\sim \sqrt{\frac{V_{G_k}}{R_{G_k}^2} \sum_i \frac{1}{V_{ik}} \left(\frac{\partial X_i}{\partial G}\right)^2_{P_k}}.$$

For path coincident deviations being rendered with respect to a designated path, $$W_{G_k} = \sqrt{\sum_i \left(\frac{\partial X_i / \sqrt{V_i}}{\partial R_G (G - G) / \sqrt{V_G}}\right)^2_{P_k}} \quad (97)$$

$$= \sqrt{\frac{V_{G_k}}{R_{G_k}^2} \sum_i \frac{1}{V_{ik}} \left(\frac{\partial X_i}{\partial (G - G)}\right)^2_{P_k}}.$$

And, for path-oriented data-point projections being rendered with respect to a designated path, $$W_{G_k} = \sqrt{\sum_i \left(\frac{\partial X_i / \sqrt{V_i}}{\partial R_G (G - G) / \sqrt{V_G}}\right)^2_{P_k}} \quad (98)$$

$$= \sqrt{\frac{V_{G_k}}{R_{G_k}^2} \sum_i \frac{1}{V_{ik}} \left(\frac{\partial X_i}{\partial (G - G)}\right)^2_{P_k}}.$$

In accordance with the present invention, the spurious weight factor generator (part 1), 58, as rendered in FIG. 7, comprises means for initiating the rendering for any of four alternate forms for spurious weighting, depending upon the selection of a deviation path as designated by the reduction selection, RTYP$( ) and the path option parameter, PTH %( ) said four alternate forms for spurious weighting being characterized by Equations 99 through 102 for the following four weight factor types and respective configurations:

Spurious weight factors for path coincident deviations being rendered with respect to a path designator, $$W_{G_k} = \left| \prod_i \frac{\partial \mathcal{R}_G \mathcal{G} / \sqrt{\mathcal{V}_G}}{\partial X_i / \sqrt{\mathcal{V}_i}} \right|_{\mathcal{P}_k}^{-\frac{2}{N}} \qquad (99)$$

$$= \left| \prod_i \frac{\mathcal{R}_{G_k} \sqrt{\mathcal{V}_{ik}}}{\sqrt{\mathcal{V}_{G_k}}} \left( \frac{\partial \mathcal{G}}{\partial X_i} \right)_k \right|_{\mathcal{P}}^{-\frac{2}{N}}.$$

Spurious weight factors for path-oriented data-point projections being rendered with respect to a path designator, $$W_{\mathcal{G}_k} = \left| \prod_i \frac{\partial \mathcal{R}_G \mathcal{G} / \sqrt{\mathcal{V}_\mathcal{G}}}{\partial X_i / \sqrt{\mathcal{V}_i}} \right|_{\mathcal{P}_k}^{-\frac{2}{N}} \qquad (100)$$

$$= \left| \prod_i \frac{\mathcal{R}_{\mathcal{G}_k} \sqrt{\mathcal{V}_{ik}}}{\sqrt{\mathcal{V}_{\mathcal{G}_k}}} \left( \frac{\partial \mathcal{G}}{\partial X_i} \right)_k \right|_{\mathcal{P}}^{-\frac{2}{N}}.$$

Alternate weight factors for path coincident deviations being rendered with respect to a designated path, $$W_{G_k} = \left| \prod_i \frac{\partial \mathcal{R}_G (\mathcal{G}+G) / \sqrt{\mathcal{V}_\mathcal{G}}}{\partial X_i / \sqrt{\mathcal{V}_i}} \right|_{\mathcal{P}_k}^{-\frac{2}{N}} \qquad (101)$$

$$= \left| \prod_i \frac{\mathcal{R}_{G_k} \sqrt{\mathcal{V}_{ik}}}{\sqrt{\mathcal{V}_{G_k}}} \left( \frac{\partial (\mathcal{G}+G)}{\partial X_i} \right)_k \right|_{\mathcal{P}}^{-\frac{2}{N}},$$

said alternate weight factors being rendered to include skew ratio representation.

And, alternate weight factors for path-oriented data-point projections being rendered with respect to a designated path, $$W_{\mathcal{G}_k} = \left| \prod_i \frac{\partial \mathcal{R}_G (\mathcal{G}+G) / \sqrt{\mathcal{V}_\mathcal{G}}}{\partial X_i / \sqrt{\mathcal{V}_i}} \right|_{\mathcal{P}_k}^{-\frac{2}{N}} \qquad (102)$$

$$= \left| \sum_i \frac{\mathcal{R}_{\mathcal{G}_k} \sqrt{\mathcal{V}_{ik}}}{\sqrt{\mathcal{V}_{\mathcal{G}_k}}} \left( \frac{\partial (\mathcal{G}+G)}{\partial X_i} \right)_k \right|_{\mathcal{P}}^{-\frac{2}{N}},$$

said alternate weight factors being rendered to include skew ratio representation.

In accordance with the present invention, the tailored weight factor (part 2) and essential weight factor generator, 59, as rendered in FIG. 7, comprises means for rendering representation for any several of weight factors, including forms rendered to accommodate a skew ratio in accordance with the present invention.

Essential weighting as considered for path coincident deviations can be rendered, in accordance with the present invention, in the form of Equations 103:

$$\mathcal{W}_{G_k} = \frac{\mathcal{R}_G^2 W_{G_k}}{\mathcal{V}_G} \qquad (103)$$

$$= \frac{\mathcal{R}_G^2}{\mathcal{V}_G} \sqrt{ \sum_{i=1} \left( \frac{\partial X_i / \sqrt{\mathcal{V}_i}}{\partial \mathcal{R}_G \mathcal{G} / \sqrt{\mathcal{V}_G}} \right)^2_{\mathcal{P}_k} }$$

$$\sim \frac{\mathcal{R}_G}{\sqrt{\mathcal{V}_G}} \sqrt{ \sum_{i=1}^{N-1} \frac{1}{\mathcal{V}_{ik}} \left( \frac{\partial X_i}{\partial \mathcal{G}} \right)^2_{\mathcal{P}_k} },$$

wherein the sum over the considered subscript, i, may be assumed to include only those independent variables that are being included simultaneously in a same optimization operation or on a same hierarchical level, depending upon the order and interdependence of the respective measurements.

In accordance with the present invention, the spurious weight factor (part 2) and cursory weight factor generator, 60, as rendered in FIG. 7, comprises means for rendering representation for any of several of weight of factors, including forms rendered to accommodate a skew ratio in accordance with the present invention.

Considering the likelihood as associated with multidimensional sample deviations from an expected value with a displacement likelihood related to the Nth root of an associated deviation space, a cursory weight factor can be rendered in accordance with the present invention in the form of Equations 104:

$$\mathcal{W}_{G_k} = \frac{\mathcal{R}_G^2 W_{G_k}}{\mathcal{V}_G} \qquad (104)$$

$$= \frac{\mathcal{R}_G^2}{\mathcal{V}_G} \left| \prod_i \frac{\partial \mathcal{R}_G \mathcal{G} / \sqrt{\mathcal{V}_G}}{\partial X_i / \sqrt{\mathcal{V}_i}} \right|_{\mathcal{P}_k}^{-\frac{2}{N}}$$

$$\sim \left| \frac{\sqrt{\mathcal{V}_G}}{\mathcal{R}_G} \prod_i \frac{1}{\sqrt{\mathcal{V}_{ik}}} \left( \frac{\partial X_i}{\partial \mathcal{G}} \right)_k \right|_{\mathcal{P}}^{\frac{2}{N}},$$

wherein N represents only the number of variable degrees of freedom that are being simultaneously considered. The name "cursory" is applied to the weight factor as rendered in Equations 104 in consideration of the fact that for more than two dimensions, the deviation can never be truly related to the expected value, and hence the form of Equations 104 must be generally considered as invalid for N greater than two.

Note that, in accordance to the present invention, for two degrees of freedom and for bivariate hierarchical, coupling Equations 103 and 104 reduce to a same form, that is:

$$\mathcal{W}_{G_k} \sim \left( \frac{\mathcal{R}_G}{\sqrt{\mathcal{V}_G \mathcal{V}_{ik}}} \frac{\partial X_i}{\partial \mathcal{G}} \right)_{\mathcal{P}_k}. \qquad (105)$$

Weight factors similar to those expressed by Equations 103, 104, and 105 may be expressed in the form of composite weight factors, with the partial derivatives of or with respect to the path designators, being replaced by those of or with respect to the designated paths, and rendered in accordance with the present invention by the inclusion of the respective skew ratios, as in Equations 106, 107, and 108:

$$W_{G_k} = \frac{\mathcal{R}_G^2 W_{G_k}}{\mathcal{V}_G} \tag{106}$$

$$= \frac{\mathcal{R}_G^2}{\mathcal{V}_G} \sqrt{\sum_{i=1} \left( \frac{\partial X_i / \sqrt{\mathcal{V}_i}}{\partial \mathcal{R}_G(\mathcal{G}+G) / \sqrt{\mathcal{V}_G}} \right)^2_{\mathcal{P}_k}}$$

$$\sim \frac{\mathcal{R}_G}{\sqrt{\mathcal{V}_G}} \sqrt{\sum_{i=1}^{N-1} \frac{1}{\mathcal{V}_{ik}} \left( \frac{\partial X_i}{\partial (\mathcal{G}+G)} \right)^2_{\mathcal{P}_k}} \, ;$$

$$W_{G_k} = \frac{\mathcal{R}_G^2 W_{G_k}}{\mathcal{V}_G} \tag{107}$$

$$= \frac{\mathcal{R}_G^2}{\mathcal{V}_G} \left| \prod_i \frac{\partial \mathcal{R}_G(\mathcal{G}+G) / \sqrt{\mathcal{V}_G}}{\partial X_i / \sqrt{\mathcal{V}_i}} \right|^{-\frac{2}{N}}_{\mathcal{P}_k}$$

$$\sim \left| \frac{\sqrt{\mathcal{V}_G}}{\mathcal{R}_G} \prod_i \frac{1}{\sqrt{\mathcal{V}_{ik}}} \left( \frac{\partial X_i}{\partial (\mathcal{G}+G)} \right)_k \right|^{\frac{2}{N}}_{\mathcal{P}},$$

and $$W_{G_k} \sim \left( \frac{\mathcal{R}_G}{\sqrt{\mathcal{V}_G \mathcal{V}_{ik}}} \frac{\partial X_i}{\partial (\mathcal{G}+G)} \right)_{\mathcal{P}_k}. \tag{108}$$

Advantages of weight factors as provided by Equations 103 through 105 over those of Equations 106 through 108 have not as yet been established.

In accordance with the present invention, Equations 103 through 108 may be alternately rendered to provide respective weighting for path-oriented data-point projections by replacing the type 1 deviation variability, $\mathcal{V}_G$, with a type 2 deviation variability, $\mathcal{V}_\mathcal{G}$.

Essential weighting as considered for path-oriented data-point projections can be rendered, in accordance with the present invention, in the form of Equations 109:

$$W_{\mathcal{G}_k} = \frac{\mathcal{R}_\mathcal{G}^2 W_{\mathcal{G}_k}}{\mathcal{V}_\mathcal{G}} \tag{109}$$

$$= \frac{\mathcal{R}_\mathcal{G}^2}{\mathcal{V}_\mathcal{G}} \sqrt{\sum_{i=1} \left( \frac{\partial X_i / \sqrt{\mathcal{V}_i}}{\partial \mathcal{R}_\mathcal{G} \mathcal{G} / \sqrt{\mathcal{V}_\mathcal{G}}} \right)^2_{\mathcal{P}_k}}$$

$$\sim \frac{\mathcal{R}_\mathcal{G}}{\sqrt{\mathcal{V}_\mathcal{G}}} \sqrt{\sum_{i=1}^{N-1} \frac{1}{\mathcal{V}_{ik}} \left( \frac{\partial X_i}{\partial \mathcal{G}} \right)^2_{\mathcal{P}_k}}.$$

A cursory weight factor can be rendered, in accordance with the present invention, for path oriented data-point projections in the form of Equations 110:

$$W_{\mathcal{G}_k} = \frac{\mathcal{R}_\mathcal{G}^2 W_{\mathcal{G}_k}}{\mathcal{V}_\mathcal{G}} \tag{110}$$

$$= \frac{\mathcal{R}_\mathcal{G}^2}{\mathcal{V}_\mathcal{G}} \left| \prod_{i=1}^{N-1} \frac{\partial \mathcal{R}_\mathcal{G} \mathcal{G} / \sqrt{\mathcal{V}_\mathcal{G}}}{\partial X_i / \sqrt{\mathcal{V}_i}} \right|^{-\frac{2}{N}}_{\mathcal{P}_k}$$

$$\sim \left| \frac{\sqrt{\mathcal{V}_\mathcal{G}}}{\mathcal{R}_\mathcal{G}} \prod_{i=1}^{N-1} \frac{1}{\sqrt{\mathcal{V}_{ik}}} \left( \frac{\partial X_i}{\partial \mathcal{G}} \right)_k \right|^{\frac{2}{N}}_{\mathcal{P}},$$

wherein N represents only the number of variable degrees of freedom that are being simultaneously considered. The name "cursory" is also applied to the weight factor as rendered in Equations 110, as being consistent with Equation 104.

Note that, in accordance to the present invention, for two degrees of freedom and for bivariate hierarchical coupling, Equations 109 and 110 reduce to a same form, that is:

$$W_{\mathcal{G}_k} \sim \left( \frac{\mathcal{R}_\mathcal{G}}{\sqrt{\mathcal{V}_\mathcal{G} \mathcal{V}_{ik}}} \frac{\partial X_i}{\partial \mathcal{G}} \right)_{\mathcal{P}_k}. \tag{111}$$

Weight factors similar to those expressed by Equations 109, 110, and 111 may be expressed in the form of composite weight factors, with the partial derivatives of the path designators being replaced by those of the designated paths, and rendered in accordance with the present invention by the inclusion of the respective skew ratios, as in Equations 112, 113, and 114:

$$W_{\mathcal{G}_k} = \frac{\mathcal{R}_\mathcal{G}^2 W_{\mathcal{G}_k}}{\mathcal{V}_\mathcal{G}} \tag{112}$$

$$= \frac{\mathcal{R}_\mathcal{G}^2}{\mathcal{V}_\mathcal{G}} \sqrt{\sum_{i=1} \left( \frac{\partial X_i / \sqrt{\mathcal{V}_i}}{\partial \mathcal{R}_\mathcal{G}(\mathcal{G}+G) / \sqrt{\mathcal{V}_\mathcal{G}}} \right)^2_{\mathcal{P}_k}}$$

$$\sim \frac{\mathcal{R}_\mathcal{G}}{\sqrt{\mathcal{V}_\mathcal{G}}} \sqrt{\sum_{i=1}^{N-1} \frac{1}{\mathcal{V}_{ik}} \left( \frac{\partial X_i}{\partial (\mathcal{G}+G)} \right)^2_{\mathcal{P}_k}},$$

$$W_{\mathcal{G}_k} = \frac{\mathcal{R}_\mathcal{G}^2 W_{\mathcal{G}_k}}{\mathcal{V}_\mathcal{G}} \tag{113}$$

$$= \frac{\mathcal{R}_\mathcal{G}^2}{\mathcal{V}_\mathcal{G}} \left| \prod_{i=1}^{N-1} \frac{\partial \mathcal{R}_\mathcal{G}(\mathcal{G}+G) / \sqrt{\mathcal{V}_\mathcal{G}}}{\partial X_i / \sqrt{\mathcal{V}_i}} \right|^{-\frac{2}{N}}_{\mathcal{P}_k}$$

$$\sim \left| \frac{\sqrt{\mathcal{V}_\mathcal{G}}}{\mathcal{R}_\mathcal{G}} \prod_{i=1}^{N-1} \frac{1}{\sqrt{\mathcal{V}_{ik}}} \left( \frac{\partial X_i}{\partial (\mathcal{G}+G)} \right)_k \right|^{\frac{2}{N}}_{\mathcal{P}},$$

and $$W_{\mathcal{G}_k} \sim \left( \frac{\mathcal{R}_G}{\sqrt{\mathcal{V}_\mathcal{G} \mathcal{V}_{ik}}} \frac{\partial X_i}{\partial (\mathcal{G}+G)} \right)_{\mathcal{P}_k}. \tag{114}$$

Although tailored weight factors, typified by Equations 95 through 98, and spurious weight factors, as typified by Equations 99 and 100, and alternate weight factors, as typified by Equations 101 and 102, may be considered as inherent factors in the rendition of essential and or cursory weight factors, in accordance with the present invention, they do not necessarily need to be evaluated or distinctly represented in order render said essential or cursory weight factors in accordance with the present invention.

It should be noted that for deviation paths which correspond to skew ratios which are not rendered as functions of independent variables, the weight factors that would be provided by Equations 104, 105, 107, 108, 110, 111, 113, and 114 may reduce to forms characterized in earlier patents (ref. U.S. Pat. Nos. 5,619,432; 5,652,713; 5,884,245; 6,181,976 B1; 7,107,048; and U.S. patent application Ser. No. 11/266, 224, now U.S. Pat. No. 7,383,128.) In accordance with the present invention, both functions which include independent variables and functions which include derivatives taken of or with respect to independent variables are considered as being functions of independent variables.

Referring back to FIG. 4, with continued reference to FIG. 7, the normalized weight factor and skew ratio weight factor generator, 61, of FIG. 7 renders a skew ratio weight factor as the skew ratio generated by the mapped deviation path and skew ratio generator, 40, of FIG. 4. The normalized weight factor which is generated by said weight factor generator, 61, is generated as the ratio of said skew ratio divided by the square root of the respectively considered deviation variability.

Skew ratios which are functions of independent variables are considered to be accommodated, in accordance with the present invention, by being implemented as weight factors, as the square root of weight factors, as integral parts of essential weight factors, as integral parts of cursory weight factors, or as integral parts of alternately formulated weight factors.

Skew ratios which are not rendered as functions of independent variables are only considered to be accommodated in accordance with the present invention by being implemented as integral parts of essential weight factors, said essential weight factors being rendered in correspondence with more than two degrees of freedom.

In accordance with the present invention, said skew ratio may be defined as the evaluated ratio of a non-skewed representation for dependent component deviation to a respective coordinate representation for a respectively considered reduction deviation, said ratio including an inverse of said reduction deviation being evaluated in correspondence with successive estimates for fitting parameters, said successive estimates being held constant during optimizing manipulations, said reduction deviation being rendered in correspondence with undetermined representation for said fitting parameters whose updated values are determined as a result of said optimizing manipulations, said optimizing manipulations including forms of minimizing sums and maximizing likelihood.

Referring now to FIG. 8 with reference to Equations 48 and 49 and also to FIG. 3, the option to optimize, 32, as provided by the monitor configuration display of FIG. 3 provides for evaluation of the intersection of path-oriented data-point projections with successive estimates for a fitting function as provided by Equations 48 and 49. FIG. 8 provides the exemplary QBASIC command code for rendering a projection intersection generator, 62, for establishing said projection intersections.

Realize that the easiest, and quite often the most accurate, approach for maximum likelihood estimating thus far available is the traditional approach of implementing a simple unweighted reduction deviation represented by a simple two dimensional dependent component deviation normalized on the square root of the effective variance, but the applicability of this approach is restricted to simple two dimensional regressions and hierarchical representations of the same, with restrictions on rendering likelihood which must be consistent with assumptions in the formulation of Equation 3. When these restrictions cannot be met, for whatsoever reason, an alternate option should be considered.

Referring back to FIG. 1 with regard to an accurate formulation of the normal projection from data to fitting function, 5: The QBASIC command code of FIG. 8 makes it possible to render a reasonable representation for normal path-oriented data-point projections to be rendered between the data samples along an actual normal to the fitting function. This capability can be accessed via said command code of FIG. 8 by said option to optimize, 32, as pointed out in FIG. 3. However, the associated regressions as provided by said QBASIC command code, even when implemented by improved computer systems, may end up with a somewhat slow convergence to what might possibly represent a valid inversion, or to what might prove to be merely a dip in the locus of convergence. On the other hand, convergence of path coincident deviations and path-oriented data-point projections, being considered over estimated paths, may converge more rapidly and over a wider range but are not defined to necessarily converge to an ideal fit to the data. It appears that convergence of a sum of squared reduction deviations, when appropriately selected and correspondingly rendered to include essential weighting, may be rendered to follow a locus of convergence which will include a close approximation to a best fit for the considered data and corresponding fitting function.

Referring again to FIG. 1, in accordance with the present invention, a criteria that should be considered for rendering a reasonable fit should be related to the true normal projections from the data to the fitting function, 5, or alternately, to the measure from the fitting function to the data. In order to enable this criteria in whatsoever form, an evaluation must be made of the intersection of said normal projections with said fitting function as provided by Equations 48 and 49.

Referring now to the command code of Appendix B, or the command code file, "Search.bas", which is included in the compact disk Appendix file, Appendix B, said command code of Appendix B has been modified only slightly from the command code of Appendix A to provided an example of searching for minimum values associated with said normal projections in accordance with the present invention. In the QBASIC command code of Appendix B, example is made of searching for sums of normal projections, sums of the square of said normal projections, and the sums of weighed squared normal projections, along the locus of convergence; however, in accordance with the present invention, alternate forms may certainly selected and rendered for the search. The command code of Appendices A and B may be activated by inserting said compact disk into compact disk reader D of a system with QBASIC access and executing the Dos QBASIC command.

Referring now to FIG. 9, with reference to Appendix C: FIG. 9 represents a simulation of ideally symmetrical three-dimensional data, with reflected random deviations being rendered with respect to a considered fitting function for comparison of inversions being rendered in accordance with the present invention; said considered fitting function is expressed by Equation 115:

$$\mathcal{X}_1 - \mathcal{B}_3 = \mathcal{P}_1(\mathcal{X}_2 - \mathcal{B}_4)\mathcal{P}_2 + \mathcal{P}_5(\mathcal{X}_3 - \mathcal{B}_6). \tag{115}$$

Data samples rendered by Equation 115 are read into computer memory as if they might be real data, from data files of Appendix C (i.e., from alpha numeric files residing in the compact disk Appendix file Appendix C. alternately rendered Append ˜9 for QBASIC command code access.) To run the file Errinvar.bas from Appendix A or to run the file Search.bas from Appendix B, execute the command QBASIC Errinvar.bas or the command QBASIC Search.bas or click the respective icon and, if necessary, select or provide the QBASIC program. To execute the command code, depress F5. To simulate the data of FIG. 9, select the file 3D followed by a period; then enter the following set of keyboard commands: enter 1 1 enter enter enter 8 1 4 2 1 enter enter 2 4 2 1 enter enter 3 4 2 1 enter enter enter enter 1 4 enter enter enter C enter enter enter C The first command brings up a form of the monitor display of FIG. 3. The next three commands retrieve the actual fitting parameters, which are:
$P_1=1.5$
$P_2=3.3$
$B_3=0$
$B_4=0$
$P_5=0.0038$
$B_6=0$.
The following two commands restores the monitor display of FIG. 3; then the next 20 commands render a plot of the simulated data corresponding to two of the system variables. The next command renders a plot of two alternate system variables and restores the monitor display of FIG. 3. Ten more commands, as listed. will establish initial estimates in correspondence with the simulated data. Three more commands, enter enter enter, will restore said monitor display of FIG. 3. Then, to render the processing of normal data-point projections, for example, enter the keyboard commands 4 3 enter enter 2 enter enter. Results of the inversion are:
$1.510582226068141 > P_1 > 1.501831647634542$
$3.294509057651466 < P_2 < 3.295814169183735$
$8340.364073736591 < B_3 < 8469.453119415808$
$0.2152301160732322 > B_4 > 0.21515526 11517005$
$0.01234074027189325 > P_5 > 0.01232134250102255$
$2522.350986144637 > B_6 > 2049.759269477669$.
By running the Search.bas routine of Appendix B and including the option to search for minimums related to the true normal projection, the following values are indicated:
$P_1 = 1.501831647634542$
$P_2 = 3.295814169183735$
$B_3 = 8469.453119415808$
$B_4 = 0.2151552611517005$
$P_5 = 0.01232134250102255$
$B_6 = 2049.759269477669$.
Inserting these numbers back into the Errinvar.bas routing of Appendix A and carrying the inversion our to approximately 4.48 significant figures yields:
$1.501874894250175 < P_1 < 1.501875852069227$
$3.295810646998847 > P_2 > 3.295810568934266$
$8468.930773610971 > B_3 < 8468.919172622051$
$0.2149181966777883 > B_4 > 0.2149129403015629$
$0.0122736506908001 P_5 = 0.01227259418034905$
$2039.843789485008 B_6 = 2039.624219445106$.
These results indicate that it may indeed be feasible, at least for some applications, to attempt a bicoupled form of multivariate errors-in-variables regression by evaluating respective variable pair coordinates corresponding to the intersections of normal lines, with the fitting function for lines being rendered normal in a coordinate system with respective coordinates normalized on corresponding coordinate observation sample uncertainty, said lines passing through respective observation sample data points, with the coordinates of said intersections being implemented to establish additional constraints for rendering convergence and/or searching for said successive estimates along the locus of successive estimations corresponding to a constrained minimizing of a sum of squared reduction deviations.

Referring again to the QBASIC command code of Appendices A and B, in accordance with the present invention, due to the a considerable variation in the form for data, along with associated unknowns which may be either related to the data or to the formulation of fitting functions, variations in the representation of weight factors may or may not have a profound affect on the finalized approximation. The QBASIC command code as rendered in Appendices A and B has been conceived as a type example for implementing means to render comparisons of alternate weighting and reduction procedures. It has not been rendered to accurately demonstrate the full potential of the present invention, but is sufficiently formulated to illustrate the feasibility of implementing fundamental concepts of the present invention and to provide sufficient guidance for those proficient in the art of computer programming to incorporate those concepts in accordance with the present invention.

Forms of the present invention are not intended to be limited to the preferred or exemplary embodiments described herein. Advantages and applications of the present invention will be understood from the foregoing specification or practice of the invention, and alternate embodiments will be apparent to those skilled in the art to which the invention relates. Various omissions, modifications and changes to the specification or practice of the invention as disclosed herein may be made by one skilled in the art without departing from the true scope and spirit of the invention which is indicated by the following claims.

What is claimed is:

1. A process for errors in variables reduction data processing in an automated data processing system comprising a processor, and input device, and an output device for outputting to display and/or memory in order to obtain corrected fitting parameters for a fitting function; said process comprising:
   a) inputting into said processor a raw database comprised of observation sampling measurement data points;
   b) programming said processor with a fitting function comprising fitting parameters and which represents an expected locus of said data points;
   c) selecting a reduction deviation expression for said data points;
   d) inputting estimated preliminary values of said fitting parameters for said fitting function based on said data points;
   e) thereafter using said programmed processor:
      determining dependent component deviations for said plurality of data points as the deviation of each respective data point from the fitting function along its respective variable coordinates;
      subjecting the data points to reduction deviation to determine a reduction deviation value for each of said plurality of data points;
      determining a skew ratio for each data point as a ratio of the dependent component deviation divided by the reduction deviation;
      determining a weight factor for each of said data points from the reduction deviation values thereof, the fitting parameters of the fitting function, and the respective skew ratios; and
      determining optimized values for the fitting parameters from the sum of products of the weight factors and the squares of the reduction deviations of the respective data points;
   f) reiterating step e) using the optimized fitting parameters from the preceding interation in the fitting function until the optimized fitting parameters converge or approach a limit; and g) thereafter outputting the successive iterations of the fitting parameters for the fitting function as a corrected database of sampling data points.

2. A process as claimed in claim 1, wherein the selected reduction deviation is a transverse reduction deviation.

3. A process as claimed in claim 1, wherein the preliminary values of said fitting parameters are generated using a maximum likelihood estimator.

4. A process as claimed in claim 1, wherein the data points are subjected to common regression in which each variable of the data point is alternately set as a dependent variable and is included in a common sum of addends comprising weighted squares of reduction derivatives.

5. A process a claimed in claim 1, wherein the reduction deviation expression is selected from the group consisting of:

$$\frac{(\mathcal{Y} - Y)\sqrt{\mathcal{V}_Y + \mathcal{Y}'(X)^2 \mathcal{V}_X}}{\mathcal{V}_Y},$$

$$\left(\frac{\mathcal{Y}'(X)(\mathcal{Y} - Y)\sqrt{\mathcal{V}_X}}{\mathcal{V}_Y}\right), \text{ and}$$

$$\frac{(\mathcal{Y} - Y)\sqrt{\mathcal{V}_Y + \mathcal{Y}'(\mathcal{X})^2 \mathcal{V}_X}}{\mathcal{V}_Y}.$$

6. A process as claimed in claim 1, wherein the successive iterations of the fitting parameters are outputted as a locus of corrected fitting parameters for the fitting function.

7. A process as claimed in claim 1, wherein said weight factor is an essential weight factor comprising the product of a tailored weight factor and the square of the skew ratio divided by the variability of the dependent component deviation.

8. A process as claimed in claim 7, wherein the dependent component deviation variability is an estimated sampling variability of the dependent component sampling measurement.

9. A process as claimed in claim 7, wherein the dependent component deviation variability is an estimate of variability which is determined from sample measurement of the associated independent variables and their respective measurement variabilities as related to successive estimates for said fitting parameters.

10. A process as claimed in claim 9, wherein the dependent component deviation variability is equal to the sum of the products of independent variable variabilities multiplied by squares of the derivatives or partial derivatives of the dependent variable taken with respect to the respective independent variables.

11. A process as claimed in claim 7 wherein said tailored weight factor is computed for a dependent variable of a data point by taking the square root of the sum of the squares of the derivatives or partial derivatives of all independent variables of that data point.

12. A process as claimed in claim 11, wherein each data point is subjected to common regression in which each variable of the data point is alternately set to be the dependent variable.

* * * * *